(12) United States Patent
Korolev et al.

(10) Patent No.: US 6,438,539 B1
(45) Date of Patent: Aug. 20, 2002

(54) METHOD FOR RETRIEVING DATA FROM AN INFORMATION NETWORK THROUGH LINKING SEARCH CRITERIA TO SEARCH STRATEGY

(75) Inventors: Anatoly Y. Korolev, Brooklyn; James T. LaTourrette, Huntington, both of NY (US); Leon L. Vickman, Encino, CA (US); Maximilian J. Sandor, Tujunga, CA (US); Timothy R. Carlson, West Hollywood, CA (US); Neal S. Pollack, Torrance, CA (US); Joann M. Ludwig, Palos Verdes, CA (US)

(73) Assignee: Agents-4all.com, Inc., Encino, CA (US)

( * ) Notice: Subject to any disclaimer, the term of this patent is extended or adjusted under 35 U.S.C. 154(b) by 0 days.

(21) Appl. No.: 09/512,755

(22) Filed: Feb. 25, 2000

(51) Int. Cl.⁷ .................................................. G06F 17/30
(52) U.S. Cl. ............................................. 707/3; 707/10
(58) Field of Search ............................. 707/3, 4, 5, 6, 707/513, 1, 2, 10

(56) References Cited

U.S. PATENT DOCUMENTS

| | | | |
|---|---|---|---|
| 5,794,210 A | 8/1998 | Goldhaber et al. | 705/14 |
| 5,920,856 A | * 7/1999 | Syeda-Mahmood | 707/3 |
| 5,924,105 A | * 7/1999 | Punch, III et al. | 707/513 |
| 6,085,176 A | * 7/2000 | Woolston | 705/37 |
| 6,085,186 A | * 7/2000 | Christianson et al. | 707/3 |
| 6,108,686 A | * 8/2000 | Williams, Jr. | 709/202 |
| 6,141,660 A | * 10/2000 | Bach et al. | 707/103 |

* cited by examiner

Primary Examiner—Jack Choules
(74) Attorney, Agent, or Firm—Fulwider Patton Lee & Utecht, LLP

(57) ABSTRACT

A user of an information network is provided with information contained within at least one of plurality of network sites in view of a user search criteria by searching a database that is populated with a plurality of other search criteria provided by other network users and a plurality of search strategies. Each of the search strategies includes information regarding network sites likely to contain information relevant to the other search criteria. The other search criteria within the database are linked with the search strategies. At least one search strategy is selected from the database based upon the user's search criteria. The search strategy is executed and the results are provided to the user in one embodiment, users can employ software agents to assist in searching, collecting, and reporting on data in accordance with the user's specified criteria.

27 Claims, 8 Drawing Sheets

METHOD FOR RETRIEVING DATA FROM AN INFORMATION NETWORK THROUGH LINKING SEARCH CRITERIA TO SEARCH STRATEGY

BACKGROUND OF THE INVENTION

1. Field of the Invention

The invention relates generally to a method of obtaining data located within an information network and, more particularly, to a computer system employing software agents for searching, retrieving, evaluating, and presenting information in response to a specified criteria. Throughout the description of the invention the term "software agent" is meant to encompass mobile, intelligent, semi-autonomous or autonomous computer software programs that utilize computer techniques to duplicate and automate the intelligence of humans, and perform tasks for humans that were heretofore conducted by humans without the aid of computer technology.

2. Description of Related Art

Within the last few years, content-rich computer networks, such as the Internet, in particular the World Wide Web ("the Web"), have been growing at an explosive rate. The amount of information available on the Web is increasing exponentially. Unfortunately, with this exponential increase in information comes a corresponding exponential decrease in the probability of an individual locating all of the information relevant to his needs or interests.

With reference to FIG. 12, in an exemplary Web searching environment, two parties—a requester looking for a specific item and a provider offering that specific item—each have a Web site. The requester may be, for example, a computer manufacturer interested in purchasing video boards for his CPUs while the provider is a video board supplier. The most typical way for each of these parties to locate each other on the Internet is through the use of a search engine.

Search engines rely on software agents, i.e., Web robots, to search the Web. A description of various applications for software agents, including search engine applications, is contained in Agent Sourcebook, by A. Caglayan and C. Harrison, Wiley Computer Publishing, Copyright 1997. These Web robots catalog documents and store the information contained within these documents for transmission to the search engine's parent database where it is categorized and stored. When a search engine is run, the database is searched using keyword search terms provided by the user. A list of uniform resource locators (URLs) matching the search query are presented to the user. The user must then manually enter each of the sites associated with the URLs and determine the relevancy of the network site with respect to the search query.

In the above example, the probability of either the requester or provider finding the other through a search engine is limited for several reasons. First, search engines require continuous active participation by either the provider or the requester. At least one or the other must enter a keyword search criteria, wait for the search engine to provide results and then review the results. If the individual is not satisfied, the process must be repeated with either a new or a refined search criteria. This procedure is both time consuming and tedious and often so frustrating that the party conducting the search terminates the search process before any useful results are obtained.

A second reason for limited success through a search engine is that the breadth of information available through a search engine is necessarily limited to the information within its database. Thus, information relevant to a search criteria that is not located by the Web robot and stored in the search engine's database cannot be provided to the user. In the above example, the provider A's site or the requester B's site may not be cataloged in the search engine being used by the other party, in which case, neither can locate the other. In addition, any requesters and providers, such as C, D, E and F in FIG. 12, which establish Web sites subsequent to a search conducted by a party, would remain unknown to the party unless the search engine search process is repeated.

Hence, those concerned with obtaining information located within an information network have long felt the need for a method of efficiently and actively searching the network for information in response to a search criteria. The need has also been long felt for a method of searching a network without requiring the continued participation of the party on whose behalf the search is being conducted. The present invention clearly fulfills these needs and others.

SUMMARY OF THE INVENTION

Briefly, and in general terms, the present invention is directed to a method of actively searching an information network in response to a specified criteria provided by a network user.

In a first aspect, the invention relates to a method of providing an information network user with information contained within at least one of a plurality of network sites in view of a user's search criteria. In accordance with the present invention, the method includes the steps of providing a database and populating the database with a plurality of other search criteria provided by other network users and a plurality of search strategies. Each of the search strategies includes information regarding network sites likely to contain information relevant to the other search criteria. For example, if one of the other search criteria was related to books on astronomy, the search strategy may involve the search of .edu and .com sites. The method of the present invention also includes the step of linking the other search criteria with the search strategies. Further included are the steps of selecting from the database at least one search strategy based upon the user's search criteria, executing the at least one search strategy and providing search results to the user.

By cataloging the search criteria of others in a database along with search strategies, linking those strategies with the other search criteria and searching the other search criteria in view of the user's search criteria, the present invention provides for the sharing of search processes among multiple network users. The sharing of search processes provides increased search efficiency over the prior art search methods which, heretofore, executed each search from scratch, so to speak, without knowledge of any previously conducted searches related to a similar criteria.

In a second aspect, the invention relates to a method of introducing providers and requesters to each other based on a search criteria provided by at least one of the providers and requesters. This method is used within an information network comprising a plurality of provider network sites, each having a provider associated therewith, and a plurality of requester network sites, each having a requester associated therewith. In accordance with the present invention, the method includes the steps of providing a database and populating the database with network site data representative of the content of the network site from a plurality of the requester network sites and provider network sites. The database also includes a plurality of other search criteria provided by other providers and requesters and a plurality of search strategies comprising information regarding network sites likely to contain information relevant to the other search criteria. The method of the present invention also includes the step of linking at least one of the search strategies with at least one of the other search criteria.

To facilitate the introduction of providers and requesters, this aspect of the present invention further includes the step of creating, on behalf of each requester providing requester search criteria, a requester search agent and employing the search agent to search the database for network site data and other search criteria relevant to the requester search criteria. For each relevant other search criteria, the search agent executes the at least one search strategy linked with the other search criteria to search the information network for network sites having data relevant to the requester search criteria and providing search results to said requester.

The present invention further facilitates the introduction of providers and requesters by creating, on behalf of each provider providing provider search criteria, a provider search agent and employing the search agent to search the database for network site data and other search criteria relevant to the provider search criteria. For each relevant other search criteria, the search agents execute the at least one search strategy linked with the other search criteria to search the information network for network sites having data relevant to the provider search criteria and providing search results to the provider.

By employing search agents to actively search the network sites and databases for requester and provider information and to provide the information to interested providers and requesters respectively, in view of search criteria entered by the requesters and providers, the method of the present invention provides automated introduction of requesters and providers.

In third aspect, the invention is related to a method of communicating among a plurality of software agents. Each agent is employed by a user to search an information network comprising a plurality of network sites for information responsive to an individual search criteria. In accordance with the present invention, the method includes the steps of, for each individual search criteria, storing information data relevant to the search criteria in a database, and for each software agent, searching the database for information data relevant to the individual search associated with the software agent.

By storing search criteria information in a database and subsequently searching the database for similar search criteria the present invention provides for the sharing of information among software agents. The sharing of information provides increased search efficiency.

In another aspect, the invention is related to a method of locating data relevant to a search criteria provided by a user. This method finds application in an information network comprising a plurality of network sites. The method includes the steps of providing a database and populating the database with data representative of other search criteria provided by other users. The method further includes the step of populating the database with a plurality of search strategies, each search strategy comprising information regarding network sites likely to contain information relevant to the other search criteria. The method further includes the step of creating a search agent on behalf of the user and employing the search agent to search the database for other search criteria relevant to the user search criteria; for each relevant other search criteria, executing the at least one search strategy linked with the other search criteria to search the information network for network sites having data relevant to the user search criteria and providing search results to the user. In further detailed aspects, the search criteria provided by the user may include text based data, visual image data, audio data and/or audio/visual data.

These and other features and advantages of the invention will become apparent from the following detailed description, taken in conjunction with the accompanying drawings, which illustrate by way of example the features of the invention.

DETAILED DESCRIPTION OF THE PREFERRED EMBODIMENTS

Figure 1:
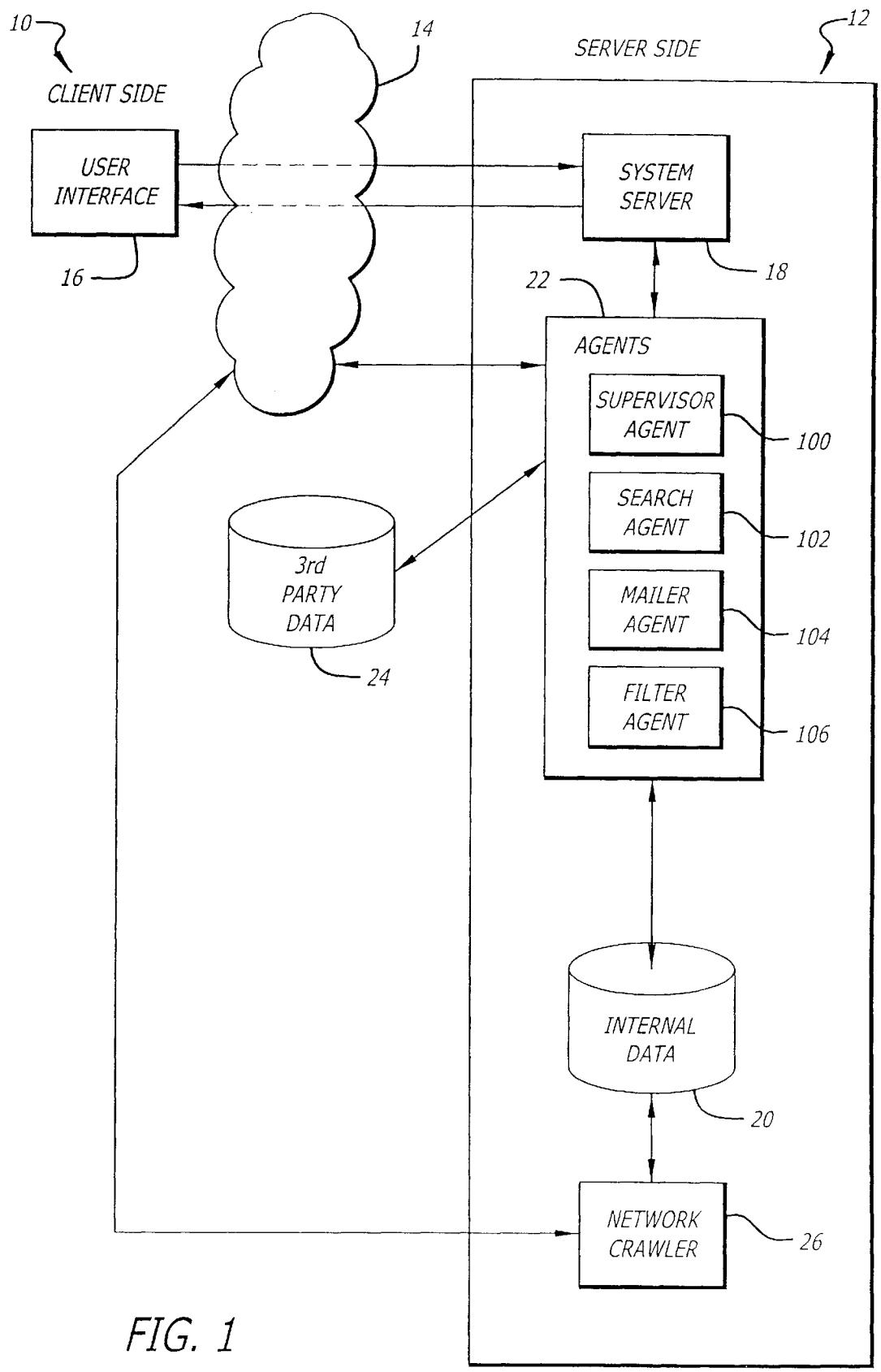
FIG. 1 is a block diagram of the system including a client side and server side interfacing through a computer network.

Referring now to the drawings, wherein like reference numerals denote like or corresponding parts throughout the drawing figures, and particularly to FIG. 1, there is shown a system including a client side 10 and a server side 12 interfacing through a computer network 14. The computer network 14 may include, by way of example, but not necessarily by way of limitation, the Internet, Internet II, intranets, and similar evolutionary versions of same. The client side 10 includes a user interface 16 through which a user may communicate with the server side 12 via the computer network 14. The user interface 16 may include a personal computer, network work station or any other similar device having a central processing unit (CPU). The client side 10 further includes graphical user interface (GUI) software that facilitates communication between the client side and the server side 12. The client-side software may be resident in the user interface 16. Alternatively, the client-side software may be network-based software capable of being accessed over the computer network 14. For example, a user may be able to access the client-side software directly on the Web.

The server side 12 includes a system server 18, which in a Web-based system may comprise a Linux Redhat 6.0/Apache Web server, and an internal database 20 for storing information. Supporting system software and database software are resident within the system server 18. In one embodiment of the invention, the system software comprises a plurality of Perl scripts, including a search program, while the database software is implemented using both Microsoft SQL7 and Oracle8i database programs.

A network crawler 26 searches the network 14 for data to populate the internal database 20. For example, in a Web-based network, the network crawler 26 locates URLs from specific interest areas, e.g., real estate, automobiles, travel, etc., and downloads the URLs to the internal database 20. The internal database 20 contains a "yellow pages" with the URLs of all the documents retrieved by the network crawler 26. In addition, the database 20 may contain entire Web sites or portions thereof. These documents are stored under appropriate interest areas in the yellow pages. The system software employs a network of agents 22 to obtain information from the internal database 20, third-party data repositories 24 and other locations accessible through the computer network 14, such as Web sites. In accordance with the present invention the agents 22 comprises one or more supervisor agents 100, search agents 102, mailer agents 104 and filter agents 106. The function of each of these agents is described below.

The search agents 102 and mailer agents 104 employed by the system are mobile in that they are configured to move throughout the databases 20, 24 and the computer network 14 in order to access or deliver information. Movement of the search and mailer agents 102, 104 may occur in any of several ways. For example, these agents 102, 104 may move throughout the computer network 14 by attaching themselves to e-mail messages, or by other means, that move between servers within the network. These agents 102, 104 may also move from server to server by transmission control protocol (TCP)-type transmissions from the port or ports of one or more servers to the port or ports of another server or servers. By further way of example and not by way of limitation, the search and mailer agents 102, 104 may also move from location to location by means of cable TV, fiber optics cables, satellite transmissions, laser transmissions, telephone and data lines of all types, including wireless networks and like evolutionary hardware and software communication conduits.

Figure 2:
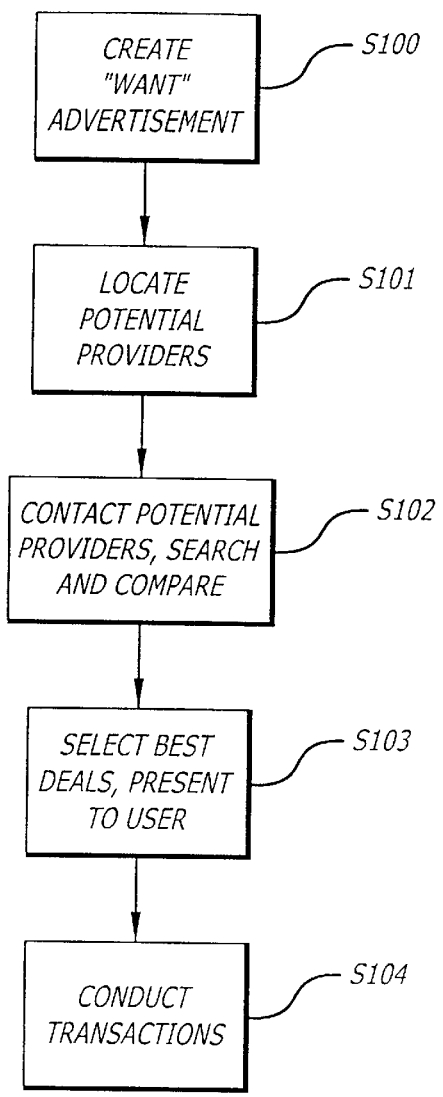
FIG. 2 is a general flowchart of a "want search" process performed by the system.

The system server 18 is configured to allow for active searching of information on the computer network 14. In an active search operation, a user accesses the system 18 and requests that one or more search agents 102 be deployed into the computer network 14 and databases 20, 24 to search for data in view of search criteria specified by the user. The search criteria may be related to a product or service the user is interested in obtaining, i.e., a "want search", or it may be related to a product or service the user is offering, i.e., a "for-sale search." With reference to FIG. 2, in a very general exemplary "want search", at step S100 a user creates an advertisement including specific search criteria. In this scenario, the user is referred to as a "requester." At step S101 the system deploys a search agent 102 that searches all relevant data on the network 14 and in the databases 20, 24, to locate potential providers. At step S102, the search agent 102 contacts the network sites of the potential providers, searches the sites and compares its findings with the specified search criteria. At step S103 the search agent 102 retrieves relevant data provides it to a filter agent 106 which selects the best deals by filtering the data using a decision engine. Decision engine processes are described in detail below. From this data, the filter agent 106 generates a list of potential providers and presents the list to the user via a user interface 16. At step S104, if authorized by the user, the filter agent 106 may conduct a transaction with one or more of the potential providers.

Figure 3:
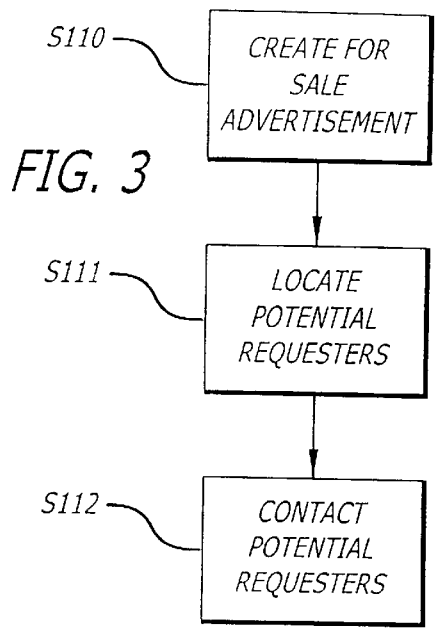
FIG. 3 is a general flowchart of a "for-sale search" process performed by the system.

With reference to FIG. 3, in a very general exemplary "for-sale search", at step S110 a user creates an advertisement. In this scenario, the user is referred to as a "provider." At step S111 the system deploys one or more mailer agents 104 that search all relevant data on the network 14 and in the databases 20, 24, to locate potential requesters. At step 112 the mailer agents 104 then contact the potential requesters by creating a publication of the provider's criteria and forwarding the publication to each of the potential requesters, by an e-mail message or a message to the user interface 16 or similar means.

Figure 4:
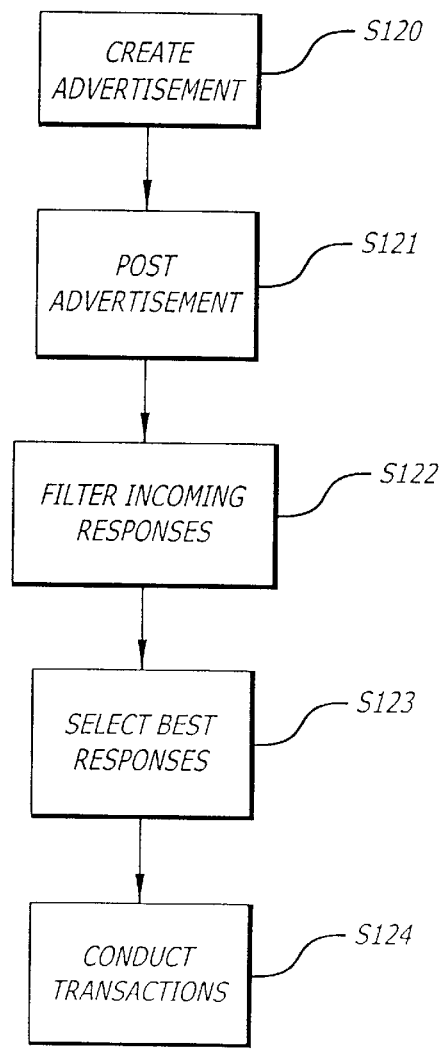
FIG. 4 is a general flowchart of a publication process performed by the system.

The system, in accordance with the present invention, is also configured to allow for passive publishing or advertising, i.e., posting. With reference to FIG. 4, in this application, at step S120 a user accesses the system and creates a "want ad" or a "for sale ad" by providing the system with advertising criteria. At step S121, a supervisor agent 100 then posts the advertisement by placing it in the system database 20 where it may be accessed by foreign agents. A "foreign" agent is any agent other than a particular user's agent and may be any of a search, mailer or filter agent 102, 104, 106. For example, in a system being used by users A, B and C, user A's search agent is a foreign agent with respect to the search agents of users B and C. Likewise, user B's search agent is a foreign agent with respect to the search agents of users A and C.

At step S122, based upon the criteria submitted by the user, the system 18 creates a filter agent 106 that resides in the system server 18. In an alternate embodiment of the invention, the filter agent 106 may reside in the user interface 16. In either case, the filter agent 106 receives responses to the user's advertisement from any interested foreign search and/or mailer agents 102, 104 and evaluates them in view of the user's criteria to determine if the responses satisfy the criteria. The filter agent 106 may also rate the responses in view of how closely they match the advertising criteria. At step S123, the filter agent 106 selects the best responses and provides them to the user. At step S124, if authorized, the filter agent 106 may conduct a transaction on behalf of the user. Filter agents 106 may be referred to as a "gatekeeper" and/or a "rater." Details on creation of filter agents 106 and their operation are provided below.

A detailed description of searching and publishing capabilities of the system appear below. First, however, descriptions of the system software architecture and system internal database are provided.

System Software Architecture

Figure 5:
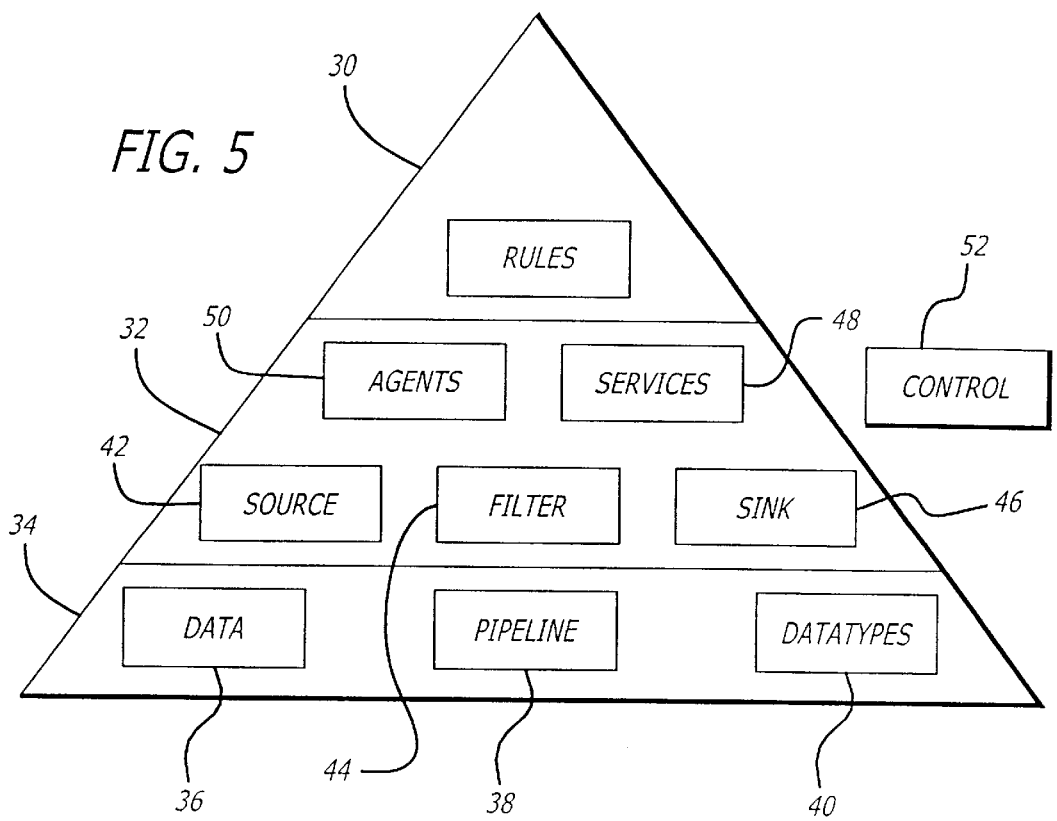
FIG. 5 is a diagram of the software architecture of the system including the various software packages contained therein.
Figure 12:
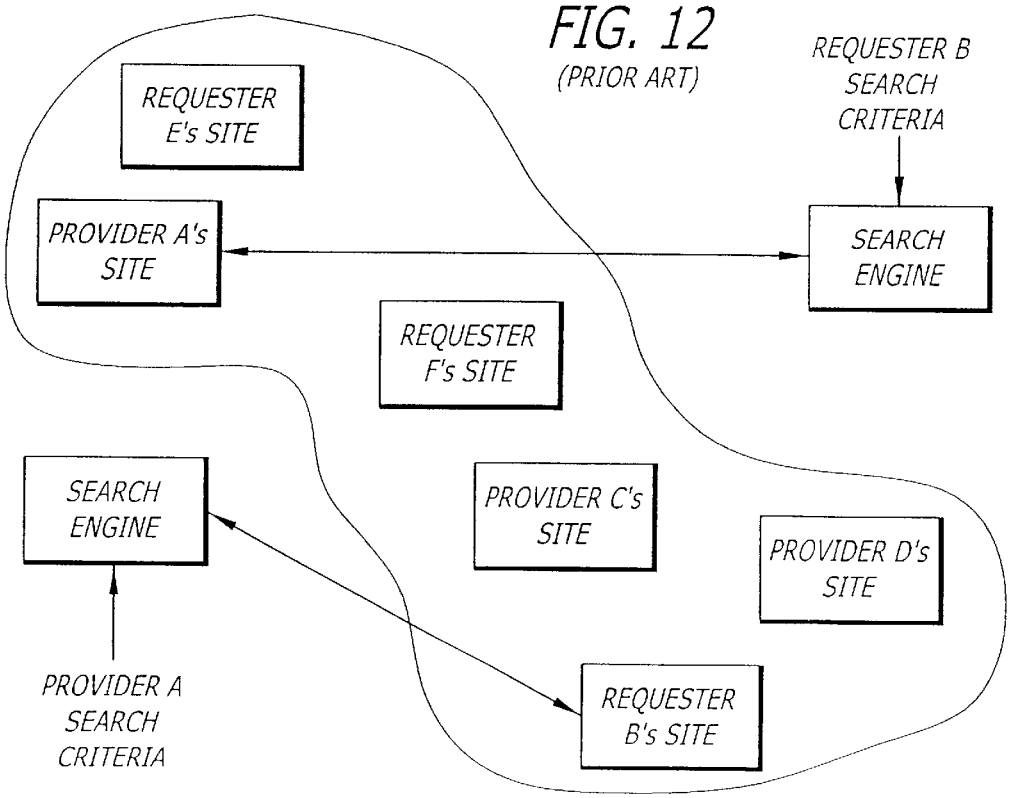
FIG. 12 is a block diagram of a prior art network search environment.

With reference to FIG. 5, the three major software components of the system include the infrastructure 34, business objects 32 and top level rules 30. Within the infrastructure 34 and business objects 32 are software packages. The infrastructure 34 consists of Data 36, Pipeline 38 and Data Types 40 software packages. The business objects 32 portion of the system includes Source 42, Filter 44, Sink 46, Services 48 and Agents 50 software packages.

The rules 30 contain the specific business rules for a particular industry sector, e.g., real-estate, travel, job search, etc. While the business objects utilize the infrastructure layer 34 to accomplish their tasks, the top-level business rules 30 are not necessarily built up on top of the infrastructure layer. Typically, the rules 30 are just templates that specify the business rules for each industry. The business objects 32 read these rules 30 in order to carry out their activities, such as validation of the user's input, and document comparison.

In one configuration of the system, in accordance with the present invention, rules contains two classes, Template and Mappings. Template specifies the specific business rules by providing fields and ranges of acceptable values, for example:<INPUT NAME="price" TYPE=dollars RANGE= "0 to 100000">;<INPUT NAME="mfr _year" TYPE=date RANGE="1900 to 2000">. Template is used particularly by the classes in the Source package 42, which is described below, when the classes need to know the template in order to create an industry specific document, such as job posting or house for sale ad. Mappings contain business categories that are related to each other, such as film and camera, automobile and insurance, etc. Mappings are used to lookup products and services and provide intelligent direct marketing rules. The representation syntax of Template and Mappings classes is preferably extended markup language (XML). As such, the classes in the Source package could utilize the MPF library to parse these templates. It will be appreciated, however that other languages may also be used.

As previously mentioned, the business objects 32 portion of the system includes Source 42, Filter 44, Sink 46, Services 48 and Agents 50 software packages. The Agents package 50 is responsible for conducting activities in the system. In accordance with the present invention, the Agents package 50 comprises a Search class and a Mailer class. Search looks for specific information, while Mailer sends out direct mailings and advertisements. The Search and Mailer are referred to herein as a search agent 102 and a mailer agent 104.

The Services package 48 includes Inbox, User Manger, Post Office, Directory Listing, Listing and Entry classes. Inbox stores the incoming offers that were allowed by the Gatekeeper, which is described below. User Manager is responsible for managing user accounts. It implements such operations as adding new users, validating user IDs and passwords. Post Office contains the users' mailboxes with any offers. Directory Listing is similar to a "yellow pages" listing and contains different business categories, such as automotive, travel, real estate, etc., and contains references to appropriate vendors and offers under each category. Listing contains a directory listing of a specific business category.

There can be many Entries under one Listing and a union of all Listings makes up a Directory. Entry represents an entry in the directory listing. Hosting Service serves as a "wrapper" to the server-side Hosting Service.

The Source package 42 represents a data repository for storing data, e.g., Web pages, database records, and the like. The Source package 42 includes a Publisher and an Adapter class. Publisher creates new data in a standard format, which in a preferred embodiment of the present invention, comprises a metadata format. Adapter converts already-existing data that is in a non-standard format to the standard format. Adapter utilizes application program interfaces (APIs) for vendor-specific data access and the MPF class in the Data package 36 for creating and reading standard-format documents. Both Publisher and Adapter use Services package 48 to download rules and rule Templates together with the MPF package 40 to create standard format metadata documents.

The Sink package 46 includes a User Profile and a Report class. User Profile stores a user's current interests and preferences as a profile. The User Profile, together with rule Templates and Mappings are used by the Gatekeeper to filter out incoming offers and are used by the search agent to determine what the user is looking for. Report keeps a Searcher or Gatekeeper report about the Documents collected.

The Filter package 44 comprises several classes, including a Match Evaluator, Simple Weighted Input Evaluator, Gatekeeper, and Rater, which are responsible for evaluation and decision-making. Match Evaluator is the root in the hierarchy for objects that encapsulate document-evaluating algorithms. Its subclasses implement different algorithms for evaluating the quality of matches. Simple Weighted Input Evaluator is a subclass of the Match Evaluator and comprises a simple "weighted inputs" evaluation algorithm. Gatekeeper obtains mailing with advertisements. Gatekeeper filters and rates the advertisements and decides which of them should be presented to the user. Rater evaluates and rates incoming offers by comparing them to the Document with the desired parameters. Rater outputs the offers in sequence from best value to worst value.

The infrastructure Data package 36 includes MPF, Element, Document and Data Model classes. MPF contains the utilities to read/write documents in the standard metadata format, such as XML/ resource description framework (RDF). The MPF package 40 represents the "low-level" metadata processing facilities. These include document writers, RDF and XML parsers, XML processors and the like. Element represents the basic element of a Document structure and may include a data object, its name and importance weight. In accordance with the present invention, Element allows for fine tuning of a search criteria. For example, a search for a house in the price range of $200–250K in the Los Angeles area may be qualified with the criteria that the location of the housing is more important than the price. Document contains an array of Elements. Document represents Element information in a standard, preferably metadata, format. Data Model is a Java class that encapsulates all the necessary attributes of the data, but in standard Java notation. This class serves as an easy representation of the data model without the overhead of XML syntax.

The infrastructure Pipeline package 38 represents the underlying communication mechanisms between the system components. Pipeline package 38 encapsulates the classes that are responsible for "low-level" document transport and other similar facilities. Uploader is one class of the Pipeline package 38. It is responsible for interaction with underlying protocols, such as hypertext transfer protocol (HTTP) or object request broker (ORB), to request, upload and post Documents to the Hosting Service. The infrastructure Datatype package 40 includes numerous classes which encapsulate: the notions of time and a time period, the concept of money, integer type and date type, choice of items, and comparable string classes.

In addition to the rules 30, business objects 32 and infrastructure 34, the system software includes a control component 52 which includes a Deployer package. Deployer encapsulates the overall agent functionality of interfacing with the user by obtaining a user's instructions and presenting reports, as well as utilizing the business modules of the system, such as Sources 42, Services 48 and Filters 44, to carry out activities. In the present embodiment of the invention Deployer is referred to as the "supervisor" or "super" agent 100.

System Database

The system database 20 (FIG. 1) comprises processes that gather, process, store, display and iterate data. In an exemplary embodiment, the database 20 comprises a plurality of tables and reference tables, as provided at the end of the specification. As previously mentioned, in an exemplary embodiment of the invention, the database is implemented using both Microsoft SQL7 and Oracle8i database programs.

The database 20 includes information about system users, i.e., customers, including personal data, areas of interests and products purchased through the system. The database 20 also stores information on network sites which may be of interest to users. This information comprises URL data which is stored in two separate tables. One table identifies URLs by keywords while the other stores detailed information on the URLs. The keyword table is searched by agents when attempting to locate URLs relevant to a user's search criteria.

Customer activity and system transactions are recorded in a transactions table (Table 9). Whenever a customer launches a search or posts an advertisement, data associated with these activities are stored in the transaction table. This data includes a keyword string describing the customer's activity. In accordance with the present invention, during a search process, the transactions table is searched by search agents 102 and mailer agents 104 for data responsive to the agent's search criteria. As the data associated with each search and mailer agent 102, 104 is posted in the transaction table and the transaction table is available for search by the agents 102, 104, the transaction table, in effect, provides a media for agent-to-agent communication that does not require direct communication between agents. This is advantageous in that it preserves system resources by eliminating the need for simultaneous execution of agent programs usually required for direct agent-to-agent communication. Instead, a user's search agent 102 or mailer agent 104 inserts data into the transactions table for foreign search and/or mailer agents 102, 104 to search. The user's search or mailer agent 102, 104 then proceeds with its own search activities or sits idle.

Strategies for searching an information network are stored in a search strategy table (Table 17). In accordance with one aspect of the invention, search strategies are categorized by keywords and keyword phrases. The system searches the search strategy table for keyword matches to determine if the keywords provided by the user have an existing search strategy. For instance, if the search is for scientific data, the search strategy may involve searching university (.edu) sites known for that field of study, e.g., Caltech and MIT for physics. If the search involves automobiles, the search strategy may involve searching automobile sites. If a match is found in the search strategy table, the search strategy associated with the keyword is used in the search. The database 20 also includes dictionary tables which include keywords, most commonly used words, combinations of words, and the like. These keywords in the keyword table aid in the search process to narrow searches by searching the database files by one or more keywords.

In accordance with another aspect of the present invention, the search strategy table (Table 17) is linked, by keywords, with the transactions table (Table 9). Successful searches are indicated in the "tran_comp_cd" column of the transactions table and thereby made available for future use by other users who may happen to be searching for the same or similar item. For example, if a user conducts a search for a specific make and model of an automobile and the search is successful, the system may use that search strategy to augment the searches of subsequent users who are searching for the same or similar automobile.

Search results are stored in several search results tables (Tables 5 and 6). One table stores search results that are obtained by searching the URL table while the other stores search results that are obtained by searching the transaction table. When a user accesses the system, these tables are searched to determine if any new search results were obtained by the user's agent since the last time the user accessed the system.

System Operation

In a preferred application of the system, the computer network 14 comprises the Internet. Accordingly, the system operation description focuses on this application. The invention, however, is not limited to applications on the Internet and may be used to obtain information from data depositories located in any type of computing machine or device, including, but not limited to optical computers, super computers, hand-held computers, cellular phones, television-top boxes, cable TV devices, satellite-related devices and evolutionary versions thereof In addition, the present invention may operate to obtain information over all types of transmission media including fiber optics cables, satellite transmissions, telephone lines, microwave transmitters and evolutionary versions thereof.

Figure 6:
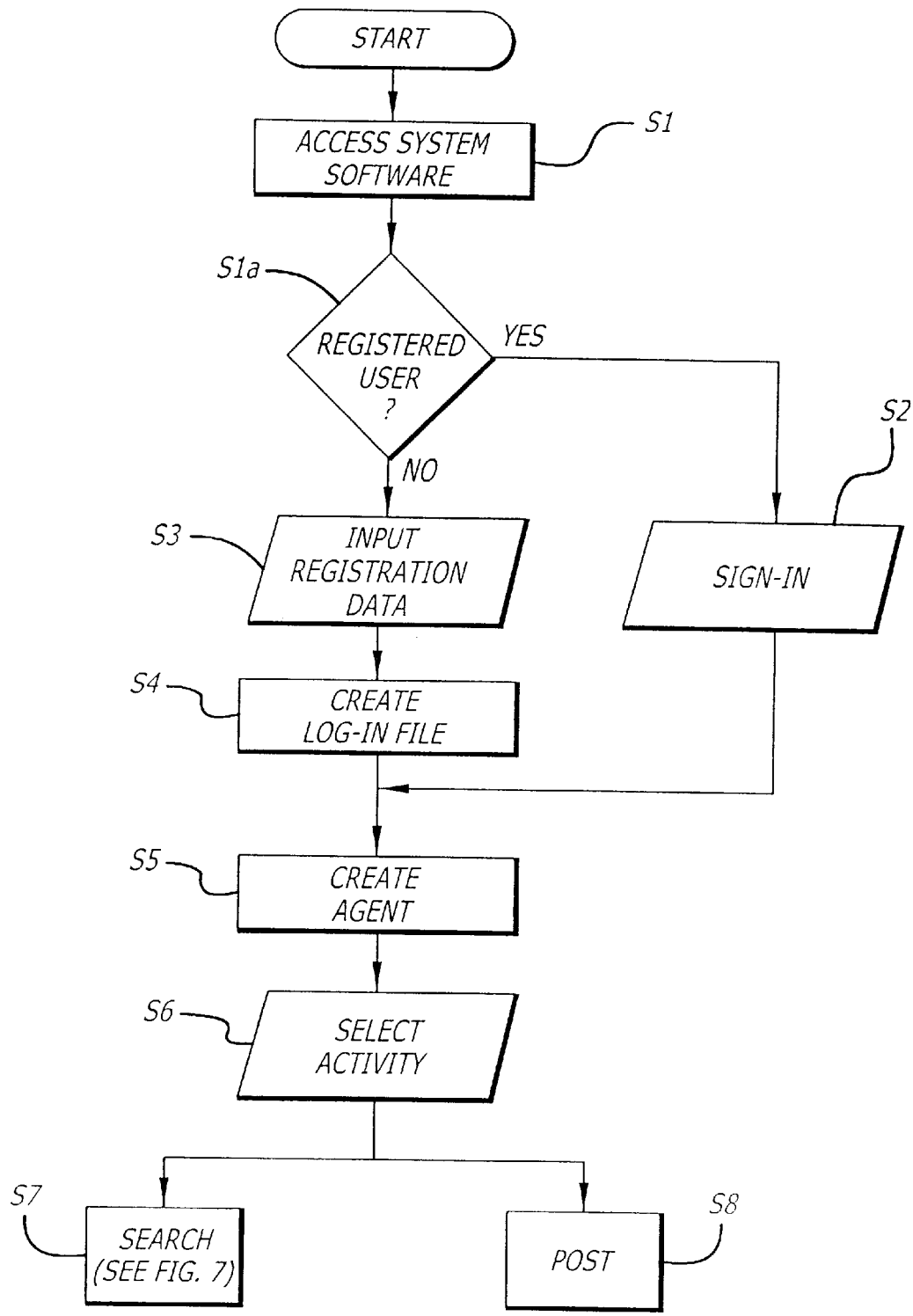
FIG. 6 is a flowchart depicting the process by which a system user accesses the system and initiates a system activity (search or publish)

In operation, with reference to FIG. 6, at step S1, a user accesses the system server through a user interface 16. At step S1a the system instructs registered users to sign in and unregistered users to register. If a user is already registered, at step S2, he may sign into the system by entering his user ID and password. The user ID and password are validated against the customer table in the database. If the ID and password are valid, the user proceeds to step S6. If a user is unregistered, at step S3, he is asked to complete the registration process. During the registration process, the user selects a user ID and a password. The user then provides personal data including his name, mailing address, e-mail address, telephone number and a fax number. This information is stored in the customer table in the database 20. At step S4, the system creates a user log-on file based on the information provided by the user. The user log-on file is used by the system to gain access to various network sites which may require particular user data. The system stores the log-on file in the customer table (Table 1) of the internal database 20 for future, repeated use, thereby eliminating the need for the user to manually re-enter his personal data.

At step S5, the system creates a super agent 100 by asking the user to give a personal name to the agent. At this time, the user may deposit text, HTML and XML files, graphics, video and other types of current and evolutionary file formats describing the item the user is interested in finding or offering. The user also provides a keyword or keyword phase describing his area of interest. At this time, the user may also provide negotiation parameters and consummation instructions, described further below. The user may also provide credit card information and security information such as an encryption certificate and digital signature. The information provided by the user may be placed in the system server 18 on behalf of the user's super agent 100. Alternatively, the client side of the system can host the user's deposited files if requested to do so by the user.

Once the user has named his super agent 100 and deposited any file information, the user submits his data, via a common gateway interface (CGI) Perl script to the transactions table (Table 9) of the database 20. The system then assigns a date/time stamp and a customer identification number (CIN) to the super agent 100. The text based user files go by SQL calls to the transactions file table (table 12) while visual and/or audio based files go to the transaction image tables (table 10). The interest area provided by the user goes by SQL call to the customer by interest table (table 4). Any negotiation rules, credit card information or security information provided by the user go by SQL call to the transactions table (table 9).

At step S6, the user selects the activity which he wants his super agent 100 to perform for him. For example at step S7, a user may ask his super agent 100 to deploy a search agent 102 in order to search for a particular product or service. Alternatively, at step S8 the super agent 100 maybe asked to post information about the user's products or services. Outstanding search results from any previous search by a user are looked for in the search results table and displayed if appropriate.

Search Application

Figure 7:
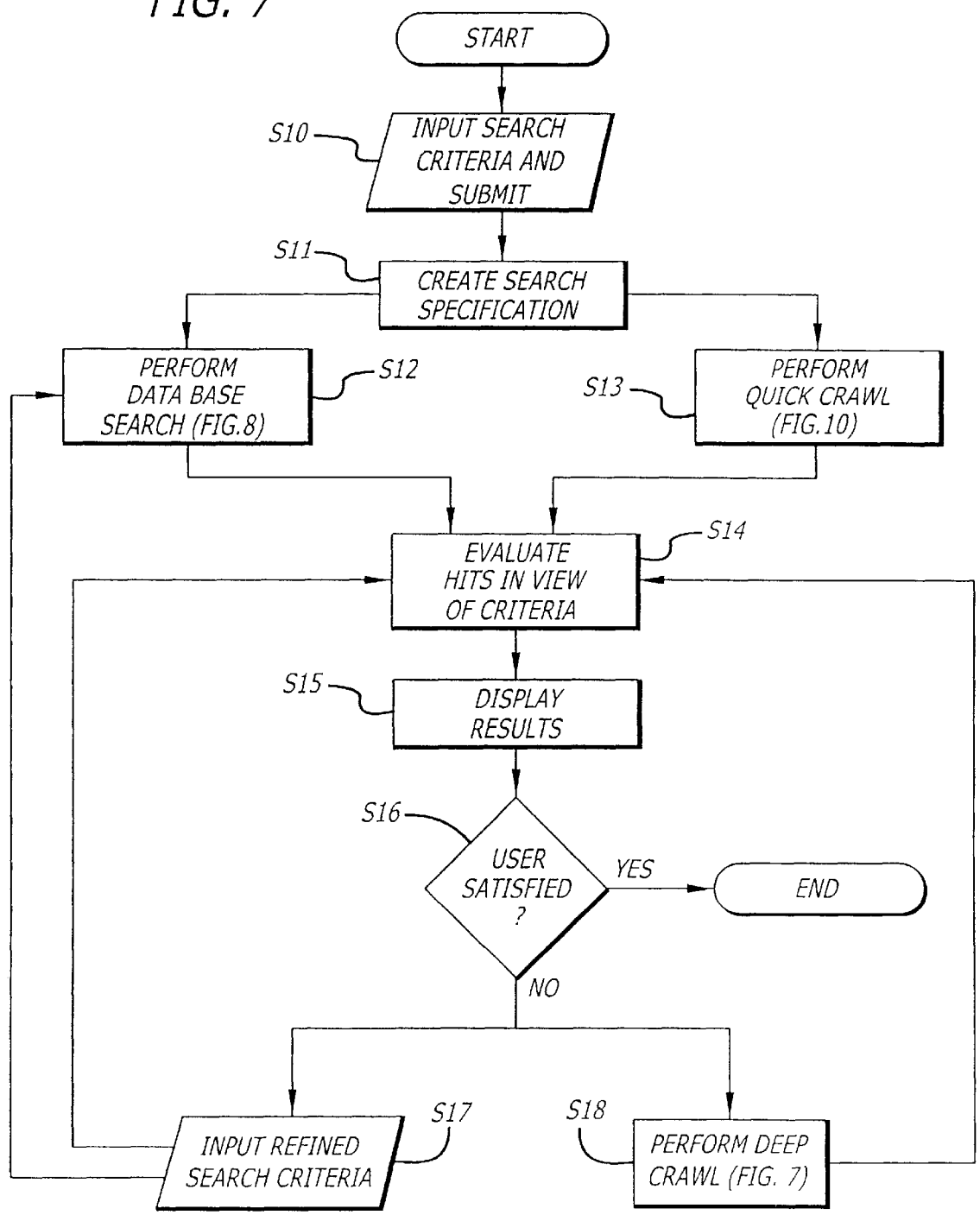
FIG. 7 is a flowchart depicting the process by a which a user and the system interact during a system search and the various search activities (database search, quick crawl and deep crawl) performed by system agents during a search.

In a search application, the system searches the computer network 14 for information responsive to a "want" search or a "for sale" search. The following description focuses on a "want" search. It is understood, however, that the operation of the system is generally the same for a "for sale" search. With reference to FIG. 7, during a search, at step S10, the user enters search criteria with respect to a product or service of interest. Using a system graphical user interface ("GUI"), the user provides search information. One version of the system presents the user with a lookup plug-in menu. The system may store the information about the available plug-ins on the user's computer, or the user can connect to the system server to receive the list of the latest available plug-ins. "Plug-ins" are modules that allow the user to work with specific business data, such as real estate, automobiles, travel, job search, etc. Once the appropriate plug-in is obtained, the plug-in then presents the user with a form that he completes to provide information about the search.

The "plug-in" concept is just one of several methods by which the system obtains information from the user in a format conducive to the searching aspects of the system, and is used herein by way of illustration, but not by way of limitation. Key word searches, computer-resident word-dictionary techniques, and more sophisticated computer algorithms, parsing and string processing techniques may also be used by the system for search purposes.

Continuing with the "plug-in" example, the user selects the area of interest by either selecting a plug-in from the list or by providing the information himself. For example, if a user is interested in obtaining information on an automobile, the plug-in may request information from the user regarding the make, model and the price range of the car of interest. The plug-in may also request ranges of acceptable values, such as price range, yes/no feature options, and weight factors to indicate the importance of different criteria rated on a numeric scale, such as from 1 to 9, with more important criteria given a higher number.

If the plug-in does not exist, the program may provide the user with the following message: "The plug-in you are looking for is not yet created. Please hit the submit request button so that we'll be able to build this plug-in for you. Please share with us any other comments you may have." Alternatively, the system may allow the user to create his own plug-ins upon request, and the new plug-in is added to the system's plug-in database.

Once the search criteria is entered, the user submits the search. At step S11, the system stores the search criteria in the transactions table of the database while the system's MPF transforms the user input into a search specification. The search specification is preferably in a meta data format such as XML/RDF, although it may be in data formats such as HTML. Meta data is preferred because, in addition to providing data itself, it provides information about the meaning of the data (semantics) by providing data about data. For example, the tag <HEIGHT=25> provides two pieces of information: one is the value (25 units), and the other is the description of what is this piece of data is about (height of an object). In this case, 25 is the data, which gives us the value, and HEIGHT is the meta data which provides the clue about what this value refers. The meta data format allows users to define not only the values of data they are looking for, but also the semantics, i.e., the actual meanings of the values they are looking for, and/or the context in which they are found in the data.

In one embodiment of the invention, the system utilizes RDF as a standard for the meta data definition. RDF is a foundation for processing meta data. RDF uses XML as the syntax for the representation of both data and meta data. RDF provides for the establishment of a common language among Web-based browsers and software applications so that browsers and applications can interact with each other autonomously. Additional information on RDF may be found at www.w3.org.

Once the search specification is created, the system integrates the search specification into a search agent 102 and deploys the agent to the computer network. In one embodiment of the invention, the search specification comprises Perl regular expressions which are described further below and in detail in Mastering Regular Expressions, by J. Friedl, O'Reilly & Associates, Copyright 1997, which is incorporated herein by reference. The Perl regular expressions are used in a GET $URL command of the Perl search program, located in the CGI bin directory of the system server 18. The search program launches a search agent 102 into the information network to look for Web pages that contain all or a portion of the text identified by the regular expression. The search agent 102 also uses the search specification as a reference for comparison against relevant documents found by the search agent. The search agent 102 starts a search for items that may be of interest to the user, based on the search specification. The areas of the computer network to be searched include the system's internal database (step S12), various network sites (steps S13 and S18), as well as an array of third-party databases.

Figure 8:
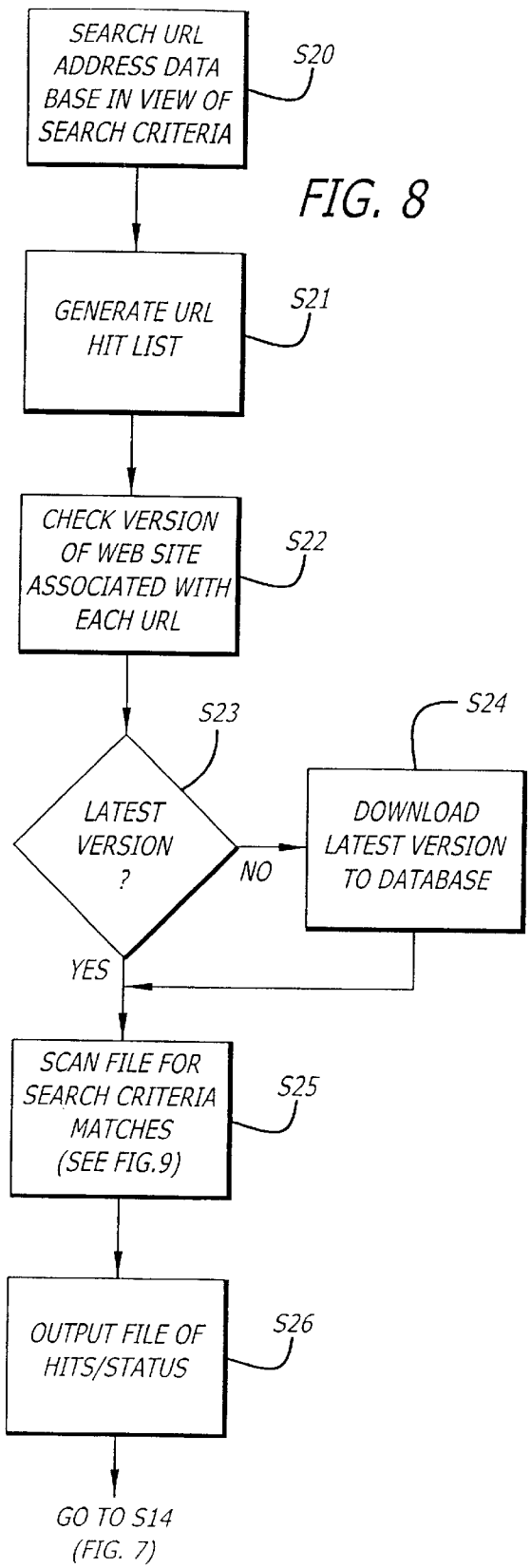
FIG. 8 is a flowchart of the database search of FIG. 7.

With reference to FIG. 8, the search agent 102, at step S20, begins an internal database 20 search by searching the URL-by-keyword table of the database for keywords responsive to the search specification carried by the search agent. To that end, the search agent 102 may contact the system server 18 and request to be provided with all the URLs within the system's yellow pages under the relevant business categories. At step S21, the search agent 102 generates a list of URL addresses that may include information responsive to the search. At step S22, the search agent 102 passes the list to the network crawler 26, which in turn, goes out on the Web to verify that the version of the Web site associated with each URL on the list and stored in the internal database 20 is the most current version. At step S23, if the Web site version in the database 20 is not current, the network crawler 26, at step S24, obtains the latest version of the Web site and downloads the appropriate portion of the Web site into the database. Once it is determined that all of the relevant Web sites stored in the database 20 are current, the search agent 102, at step S25, scans the text files defining the Web sites for information relevant to the search using keyword or other search processes.

Figure 9:
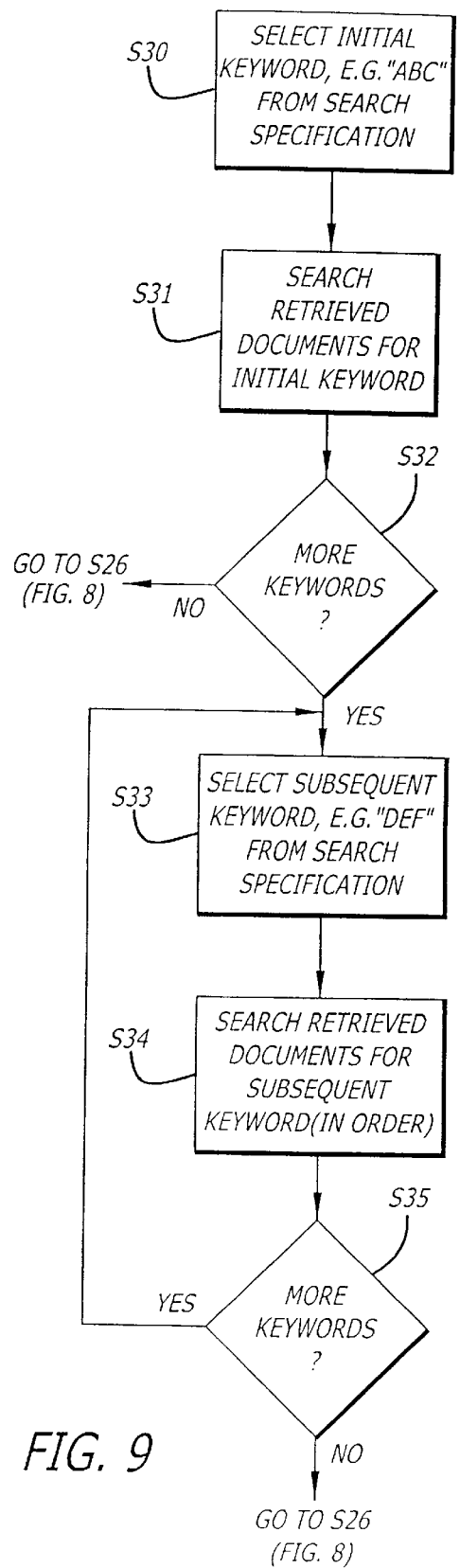
FIG. 9 is a flowchart of a scanning process performed by a system agent during a search.

As previously mentioned, one embodiment of the invention employs a regular expressions routine to perform a keyword search. For example, if the retrieved document is a Web page, the search agent 102 searches the text content of the Web page for text strings that match text strings in the search specification. With reference to FIG. 9, using the previously created regular expressions search specification, the search agent 102 scans the retrieved documents as follows. At step 30, the search agent 102 selects an initial keyword string, e.g., "abc" from the search specification. At step S31, the agent 102 searches each of the retrieved documents for the initial keyword. Documents having the initial keyword are retained by the search agent 102 while the remaining are discarded. At step S32 the search agent 102 determines whether the search specification contains additional keyword strings. If there are no more keyword strings then the process ends. If there are additional keyword strings, at step S33, the agent 102 selects a subsequent keyword string, e.g., "def" from the search specification. At step S34, the search agent 102 searches each of the retrieved documents for the initial keyword string and the subsequent keyword string, in that order. Documents having the first and second keyword strings are retained by the agent 102 while the remaining are discarded. At step S34, the agent determines whether the search specification contains additional keyword strings. If there are no more keyword strings, then the process ends. If there are additional keyword strings, the process repeats steps S33 and S34. This process is repeated until the agent 102 is satisfied that the retrieved document satisfies the search criteria set forth in the search specification.

Continuing from FIG. 9 to FIG. 8, at step S26, the agent outputs a file of hits comprising the documents deemed by the agent 102 to match the search criteria. The search results are also stored in the search results tables in the database. Prior to providing search results, the search agent 102 provides an output indicative of the status of the search. This may be an indication of the time remaining in the search or the number of URLs being scanned. This information is generally made available to the user over the user interface.

Figure 10:
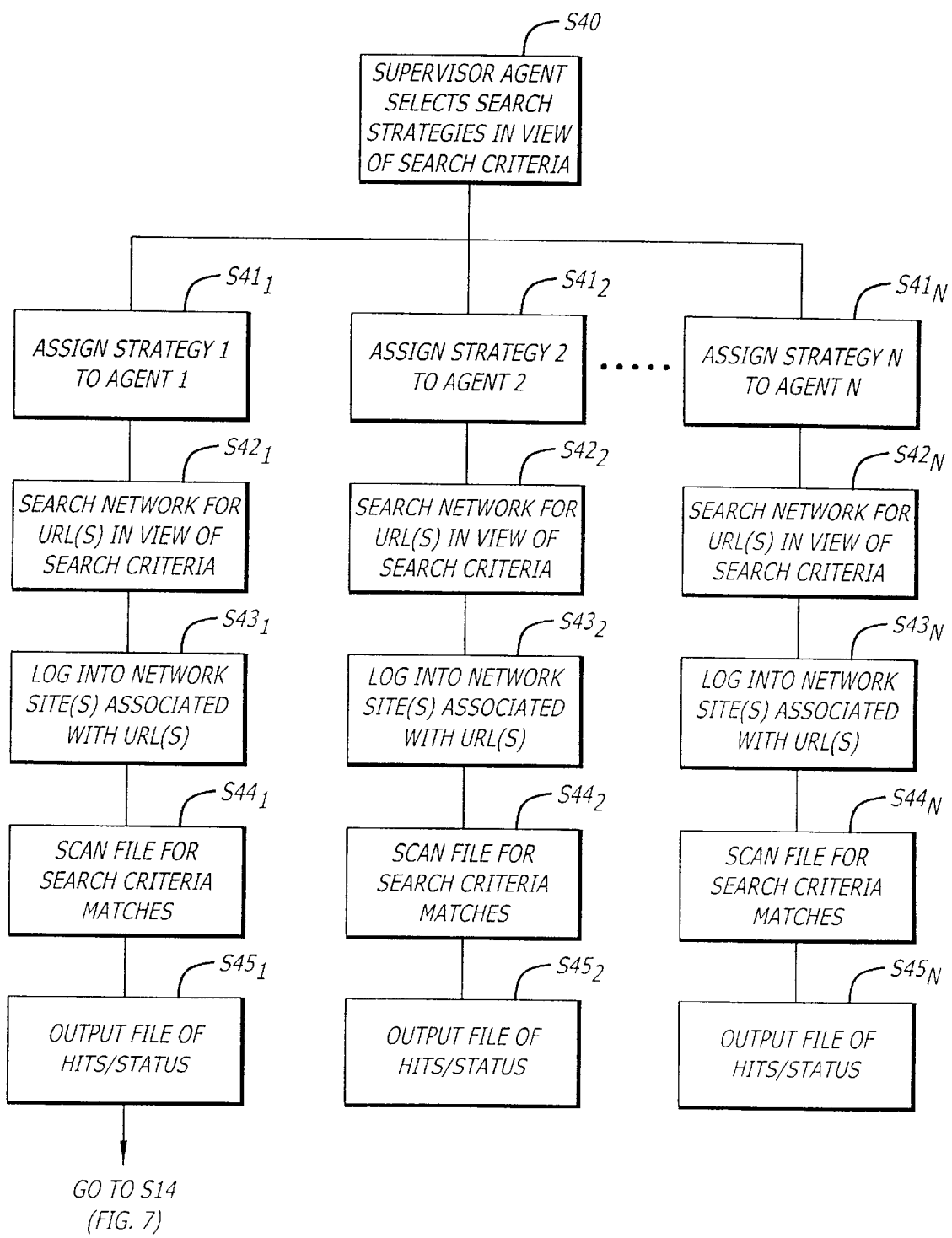
FIG. 10 is a flowchart of the quick crawl search of FIG. 7.

Returning to FIG. 7, the system may initiate, at step S13, a quick crawl simultaneously with the internal database 20 search just described. With reference to FIG. 10, at step S40, the system selects a search or search strategies in view of the search criteria. As previously mentioned, the internal database 20 includes numerous search strategies to provide efficient search processes. Search strategies are selected in part by scanning the search strategy database tables for text strings that are the same as, or are similar to, keywords located in the database tables. The network sites linked to these keywords are then searched by the search agent 102. The agent 102 may also search the database 20 for similar successful searches already conducted by other search agents 102. This search is also conducted using keywords. If a match is found, the agent 102, as part of its search strategy, performs the previously successful search. The search strategy may also involve searching the actual web sites, as opposed to the portions of web sites stored in the database, identified during the internal database 20 search process just described.

The system employs a supervisor agent 100, i.e., "super" agent, to oversee the quick crawl process. The super agent 100 determines the number and type of search strategies relevant to the search criteria and the number of search agents 102 necessary to perform the searches. If more than one search "agent" 102 is required, the system clones a search agent 102 and assigns it a specific search task. There is usually a one-to-one correspondence between search strategies and search agents 102, that is, one agent is responsible for executing one search task. The purpose of the super agent 100 is to ensure that the crawl is as efficient as possible. To that end, the super agent 100, ensures that any aspect of the search process is not duplicated by one or more search agents 102. The super agent 100 also determines whether a particular strategy should be assigned to a free or pre-positioned search agent 102.

A free search agent is one that is launched from the system server 18 and is available to roam around the Web. A pre-positioned search agent, on the other hand, is one that is permanently located in a server remote from the system server 18 and near the server hosting a particular Web site. For example, the system may employ a pre-positioned search agent 1 resident on a server near the Web site of a particular automobile manufacturer. Accordingly, this pre-positioned agent would likely perform a portion of a search related to a particular automobile. By using pre-positioned agents, the system allows for more efficiency, in that the time delay associated with a free agent roaming to the Web site of interest is essentially eliminated.

Referring again to FIG. 10, at step S41, once the super agent 100 determines the search strategies, the various tasks associated with that strategy are either individually or collectively assigned to one or more search agents 102. Each of these agents 102 performs a search as follows. At step S42, the search agent 102 obtains an index of all the URLs that have documents that may include information responsive to its particular search strategy. These URLs are located by searching the internal database 20, any third party databases and the Web. At step S43, the search agent 102 obtains the log-on file associated with the user from the transactions table of the database 20 and attempts to log into the Web site associated with each URL on the list. If the search agent 102 cannot log into a Web site, it requests any additional information from the user that is necessary to complete the log on process.

The search agent 102 iterates through the URL list by connecting to the Web servers on the URLs in the list and requesting RDF documents via HTTP. If no RDF documents are available, the agent 102 searches for XML documents. If no XML documents are found, the search agent 102 uses HTML documents and processes them with MPF, or directly, as HTML documents, or some variation or combination of these formats. At step S44, the search agent 102 scans the files defining the Web site for information relative to the search criteria as previously described with reference to FIG. 9. At step S45, the search agents 102 output files of hits comprising the retrieved documents deemed by the agent to match the search criteria. Search results are also stored in the search results table of the database 20.

Returning to FIG. 7, at step S14, once the search agent or agents 102 find the documents relevant to the search criteria, a filter agent 106 evaluates, i.e., rates, the quality of the information contained in the hit documents prior to presenting the information to the user. If the information falls within an acceptance criteria, the filter agent 106 saves the "found" document and records the quality of the match, as well as brief information about it. The actual"match-making" process is as follows. The filter agent 106 determines how many items in the search specification match the items in the found document. For example, in a search for a particular item to purchase, the filter agent 106 determines if the values of the item offered for sale in the found document falls within the range of the desired values specified in the search specification. The filter agent 106 also evaluates the quality of the match by calculating a weighted average of item characteristics in the found document in view of the "weight factors" specified in the search specification.

For example, in a real estate search, if the price of the house has a weight of "3" (not very important) and location has a weight of "9" (very important), the filter agent 106 includes offers with higher prices in the same location, but rejects all offers within the same price range, but in a different neighborhood. As a further example, if the search was related to the purchase of a laptop computer, the search agents 102 would likely return a number of computers available for purchase over the computer network. The filter agent 106 rates the offers and creates a value scale, with the better deals presented on the top of the list. The better deal does not necessarily mean the lowest price. The intelligence of the filter agent 106 takes into consideration a vast array of factors that determine the optimum value according to the criteria entered by the user. For example, criteria regarding weight, processor speed, size of hard drive is considered when rating the documents found by the search agents 102. This decision making is performed by one or more of the system's algorithms.

Once the filter agent 106 rates the found documents, it creates a brief report of its findings. At step S15, the search results are displayed to the user through the user interface 16. At step S16, the user determines whether he is satisfied with the search results. If so, the search is ended and the process proceeds to a negotiation and consummation step, as described in detail below. If the user is not satisfied, the system, as step S17, may prompt the user to refine his search by altering the existing search criteria or inputting additional search criteria. For example, if the user has decided that the size of the hard drive is more important to him than the weight of the laptop, then this criteria may be changed and the system repeats steps S12 and S14.

Upon completion of a search, the user may browse through the report and look into items that he considers interesting. If instructed by the user, the search agent 102 may repeat a search periodically to look for new documents as well as for updated ones. The documents previously found by the search agent 102 that have not been modified since the last evaluation are ignored. If instructed, the search agent 102 may contact, for example, by e-mail, the sites it visits to let the proprietors of the Web sites know what the search agent is looking for and provide contact information, such as the user's URL address.

At step S18, if the search results are not successful, the user may initiate a deep crawl search. A deep crawl is similar to the quick crawl search previously described, except for the time lapse of the crawl and the search strategies involved in the crawl. The deep crawl search strategies are more intelligent than those in the quick crawl search in that they involve more sophisticated search algorithms. These deep search strategies are also stored in the search strategy table of the database. The execution of the search strategies necessarily involve more processing time and, thus, result in an increase in the time duration of a deep crawl relative a quick crawl.

Figure 11:
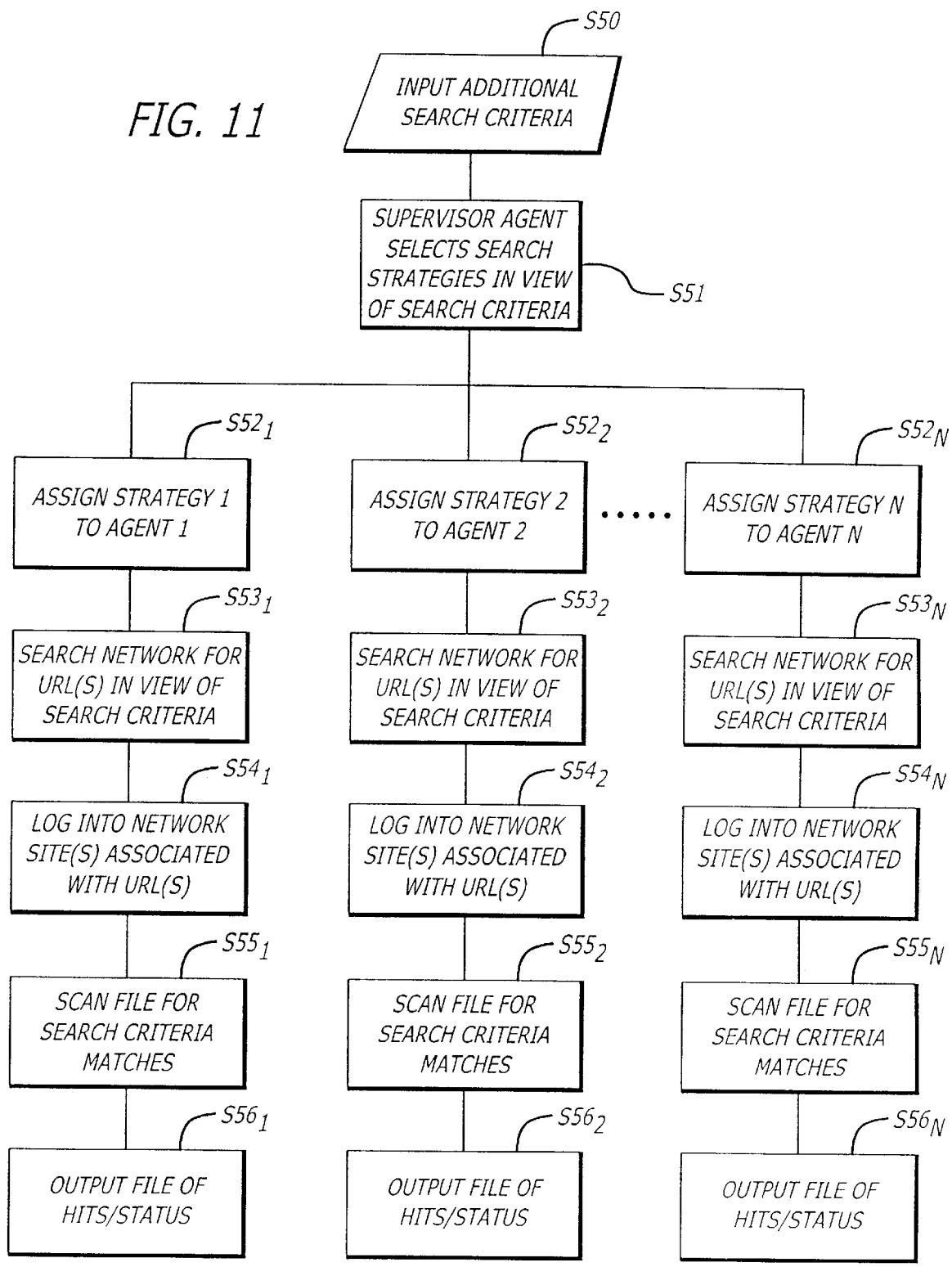
FIG. 11 is a flowchart of the deep crawl search of FIG. 7.

With reference to FIG. 11, at step S50, the user inputs additional search criteria, if any, for the deep search. Such additional search criteria may include more detailed criteria relevant to a particular search. For example, in a real estate search, the additional criteria may include users choices regarding lot size, swimming pool, Jacuzzi, etc. A deep search may also involve a different fundamental search approach. For example, a quick search strategy may involve a breadth-first search while a deep search may involve a depth-first search. Details regarding these types of searches are available in Mastering Algorithms with Perl, by Jon Orwant et al., O'Reilly & Associates, Inc., Copyright 1999.

At step S51, the system selects a search or search strategies in view of the search criteria. As with the quick crawl, the system employs a super agent 100, to oversee the deep crawl process. At step S52, once the super agent 100 determines the search strategies, the various tasks associated with that strategy are either individually or collectively assigned to one or more free or pre-positioned search agents 102. Each of these search agents 102 performs a search as follows. At step S53, the agent 102 obtains an index of all the URLs that have documents that may include information responsive to the search. Again, these URLs are located by searching the internal database 20, third party databases 24 and the Web 14. At step S54, the search agent 102 obtains the log-on file associated with the user and attempts to log into the Web site associated with each URL on the list. If the agent cannot log into a Web site, it requests information from the user necessary to complete the log on process.

The search agent 102 iterates through the URL list by connecting to the Web servers on the URLs in the list and requesting RDF documents via HTTP. If no RDF documents are available, the agent 102 searches for XML documents. If no XML documents are found, the agent uses HTML documents and process them with the MPF, or directly, as HTML documents, or some variation or combination of these formats. At step S55, the search agent 102 scans the files defining the Web site for information relative to the search criteria as previously described with reference to FIG. 9. At step S56, the search agents 102 output files of hits comprising the retrieved documents deemed by the agent to match the search criteria. Search results are also stored in the search results tables of the internal database 20 and are evaluated by the filter agent 106, as previously described with regard to the quick crawl process.

Upon completion of a search, if authorized by the user, the search agent may negotiate and complete a transaction on behalf of the user. In accordance with the present invention, the user may provides his search agent with initial negotiation and consummation parameters. These parameters are provided through a GUI and may include, for example, the user's maximum price, starting offer price, counteroffer parameters, e.g., amount of incremental increases in counteroffer price and time between counteroffer increases. Additional parameters may include a limit on negotiation time, a request that the search agent pick the best offer within a certain time frame, that the agent present the user with a rating of offers considering the key factors along with price and that the agent withdraw all unaccepted offers/ counteroffers no later than a specified time. If the negotiation process is successful and the agent is authorized to do so, the agent completes the transaction using the credit card information and the security information stored in the system database.

With reference to FIG. 1, the agents 22 reside on the server side 12. In an alternate configuration of the system, the agents 22 may be downloaded to the client side 10, for example, into the CPU of the user interface 16. In this configuration, a search agent 102 is deployed from the client side 10 and may pause its search when the user goes off line from the network, and resume the search when the user goes on line again. This, however, may consume considerable network bandwidth and computing resources. Accordingly, it is preferred that a user deploy his agent from one of the system servers 18 where it can constantly run a search. Search agents 102 running on a system server external to the user interface 16 benefit from indexing and cross-referencing facilities in the system database 20 that make the search jobs more efficient.

The system remembers the user's search criteria by storing it in the internal database 20. This allows the system to automatically re-run the search at a later time to look for new information. In accordance with the present invention, a search agent 102 can also automatically modify certain search parameters to find a different array of offers. For example, in an automobile search, the search agent 102 may drop the requirement that the car color be red to find more vehicles that satisfy other search criteria. If authorized by the user, the super agent 100 also automatically invokes a search for the items in related business categories. For example, if the user is looking for a car, the super agent 100 can dispatch at the same time a search for the most affordable insurance for the type of vehicle that the user is seeking to buy.

In a "for sale" search application, the system searches the computer network 14 for information responsive to criteria related to a product or service being offered for sale. The system creates a publication or "ad" based on a user's"for sale" criteria. As in the "want" search described above, the "for sale" search application may invoke plug-ins to obtain information from the user, or in the alternative, the user may enter a text description of the information. In the plug-in version of the system, the user fills in the appropriate plug-in, describing the products or service he is offering. The same or similar plug-ins are used for both search applications.

Once the user has input his criteria, the system transforms the user input into a search specification. As with the "want" search specification, the "for sale" search specification is preferably in a meta data format such as RDF, although it may be in data formats such as HTML or XML. Once the "for sale" search specification is created, the system integrates the specification into a search agent 102 and deploys the agent to the computer network 14. The agent starts a search for prospective customers based on the "for sale" criteria. The search agent 102 uses the "for sale" search specification as a reference for comparison against relevant documents found during the search. The "for sale" search process proceeds as previously described with respect to the "want" search.

As an additional facet of the "for sale" search, a user can execute a direct marketing campaign by deploying one or more mailer agents 104 to actively submit the "for sale" search specification, i.e., advertisement, to the foreign search agents 102 and servers of any prospective customers. In the direct marketing facet, the mailer agent 104 performs market segmentation by retrieving the list of all system users, as stored in the internal database 20, and identifying the users who previously indicated interest in the items or services offered in the users advertisement.

On the customer side, the search agent 102, previously set up by the prospective customer, acts as a filter agent 106 and evaluates the offer in view of the search criteria defining the search agent. This evaluation process is identical to that described previously with regard to the "want" search. In this instance, the search agent 102 acts as a filter agent 106 in that instead of actively searching for documents, it lurks and receives incoming offers in the form of advertisements, evaluates the advertisements and either accepts or rejects the advertisements.

If the customer's search/filter agent accepts the advertisement, it further evaluates the advertisement and places it in the proper spot on a customer's "value scale", indicating how good the incoming offer is, thus completely eliminating any unsolicited or unworthy offers.

The mailer agent 104 keeps precise statistics of how many users the advertisement was submitted to and how many advertisements were actually accepted, providing useful tools for evaluating the success of the direct marketing campaign.

Posting Application

Returning to FIG. 6, at step S8, the user may select to invoke the system's posting application. In this application, the user has an option to create a publication related to the products or services he is interested in obtaining or is offering for sale. In the publish application, the system creates a publication based on the user's input. As in the system's search application described above, the publish application may invoke plug-ins to obtain information from the user, or in the alternative, the user may enter a text description of the information. In the plug-in version of the system, the user, via the user interface 16, fills in the appropriate plug-in, describing the items he is offering. The same or similar plug-ins are used for both the publish and search applications.

The system then generates a document describing the products or services of interest to the user. The document is preferably in a meta data format. The system also automatically places this document in the transactions table (Table 9) and provides the master index server with a reference to this document. The system creates a proper reference to the document and updates the internal database 20 to include the document under the appropriate business category. The document is stored in the system's internal database 20 and the user is able to host it elsewhere. e.g., user's Web site, while the system is still able to access it there.

Using the criteria entered by the user, the system also creates a filter, i.e., "gatekeeper", agent 106 for filtering all incoming responses to a user's publication. These filter agents 106 may be resident in the client side 10 CPU or the server side 12 system server 18 and are similar to a search agent 102, except instead of traversing the URLs, the filter agent 106 remains at home and accepts incoming documents. The filter agent 106 scans incoming documents responsive to the user's publication and performs the same match making process as previously described with reference to the search application of the system. As such, the user is able to configure the filter agent 106 to block out any irrelevant responses.

The foregoing description of the preferred embodiments of the invention has focused on business related transactions, including the searching, collecting and evaluating of information related to the buying and selling of goods and services. The present invention, however is applicable to all types of situations which require the searching, collecting and evaluating of information over a network. The present invention may also find beneficial application in the searching, collecting and evaluating of information other than text based data. For example, the present invention may be used to locate visual image data including graphic and pictorial files, video files and motion picture files; audio data including music and voice files and audio/visual data such as digital video disc (DVD) type motion picture files and evolutionary versions thereof using pattern recognition technology.

While several particular forms of the invention have been illustrated and described, it will be apparent that various modifications can be made without departing from the spirit and scope of the invention. Accordingly, it is not intended that the invention be limited, except as by the appended claims.

TABLE 1

Table: Customer
Purpose: To store information about a4a customers
Comments: The table is keyed by email address; an alternate key is the CIN (Customer identifier number) which exists in a one to one relation with the email address. The CIN is created for more efficient indexing in other tables (length of 10 vs length of 64) Created at time of user enrollment; updated by subsequent enrollments (or change of address etc) and by mailing process to flag invalid email address.
Volume: One row per customer

| FIELD/(type) | DESCRIPTION | COMMENT |
|---|---|---|
| USER_ID(K)(int) | ID user supplies | |
| Email_addr(VC 64) | Email address | Customers email addr |
| Last_name (VC 20) | Customer last name | |
| First_name (VC 10) | Customer first name | |
| Middle_name (VC 10) | Customer middle name | |
| Phone_num(VC 25) | Cust. Phone num | (needs expansion to pfx + num + ext) |
| Credit_cd_type (CH 1) | Credit card type (used for becoming a subscriber, not necessarily used for an individual transaction) | Value = visa, etc |
| Credit_cd_num (VC 25) | Credit Card number | |
| Credit_cd_exp_dt(dt) | Credit card expiration date | |
| Cin (FK)(UI)(INT) | Customer information number | Value gotten from last_cin table; range = 0000000001 to 9999999999; |
| Invalid_email_addr (CH 1) | Invalid email address | If mailing program determines that the email address is no longer valid, mark as 'y'; else null. |
| Birthdate(DT) | | |
| Street_Address(VC 50) | | |
| City(VC 25) | | |
| State/Province (VC 20) | | |
| Country (VC 25) | | |
| Password(VC 10) | | |
| Soc_sec #(VC 12) | | |
| Sex(CH 1) | F = female, M = male | |
| Create_dt_tm(DT) | Date/time row originally created. | |
| Updt_dt_tm(DT) | Date/time row last updated | |

TABLE 2

Table: Robot_by Customer
Purpose: To store ROBOT names generate by customer
Comments:
Volume: Number of ROBOTS x Number of Customers

| FIELD | DESCRIPTION | COMMENT |
|---|---|---|
| CIN (K)(INT) | | |
| Robot_name (VC 20) | Robot name customer gives | |
| Created_dt_tm (DT) | Date time row created | |

TABLE 3

Table: Customer_by_product
Purpose: To store information about the a4a product purchased by a4a customers.
Comments: The table is keyed by CIN; This table will generate billing information, statistical information, and possibly be used to limit type of agent search (ie if 'gold' has been purchased, agent checks here to see and then allows appropriate search etc.) Created at time of customer signup or purchase of product.
Volume: One row per product purchased.

| FIELD | DESCRIPTION | COMMENT |
|---|---|---|
| Cin(K)(INT) | | |
| Product_number (FK) | Product bought | See product_table for valid values |
| Bought_dt_tm(DT) | Date/time product purchased | |
| Expiration_dt_tm(DT) | Date/time product expires for customer | |
| Credit_cd_type(CH 1) | Visa, etc | If a different credit card is being used for conducting transactions than used for purchasing A4A product |
| Credit_cd_num (VC 20) | Card number | |
| Credit_cd_exp_dt_tm(DT) | Credit card expiration date | |

TABLE 4

Table: Customer_by_interest
Purpose: To store information about customers interests for generating email and other notices based on results of ongoing web-crawl etc.. Table can also be used for statistical and management queries (e.g. how many clients interested in 'film noir'). Notification frequency is stored here by interest, so customer can choose how often to receive relevant messages about particular topics (e.g. hourly for stocks, monthly for "Raymond Chandler" updates).
Created at time of agent launch in new subject area (or other means of identifying user's interests)
Comments:
Volume: One row per interest given by customer

| FIELD | DESCRIPTION | COMMENT |
|---|---|---|
| Cin (k)(INT) | | |
| Interest_area(VC 50) | Area of interest to customer | keyword (see Keyword table) or keyword string. Probably derived from Web Page (Such as Chemistry/Pokemon) etc. |
| Updt_dt_tm(DT) | Date/time row created or last updated. | |
| Lastuse_dt_tm(DT) | Date/time last message in this area was sent to customer | |
| Derived_interest(VC 50) | If interest was specified by customer or derived via linked keywords etc. | y = derived n = not derived (ie actualy specified by customer) |
| Notification_freq (CH 1) | How often to be notified on this subject | Values h = hourly; d = daily, w = weekly, m = monthly Null = user will not get automatic email notification-will get results from Web. |

TABLE 5

Table: Search_results_URL
Purpose: To store search results which have been obtained against the URL table.
Comments: Created by search processes as appropriate hits are found. A new row is created by each hit; data is not accumulated in a row. When users logon, this table will be searched to see if new results from last session are there.
Volume: Based on number of hits per search.

| FIELD | DESCRIPTION | COMMENT |
|---|---|---|
| Cin (k)(INT) | | |
| Tran_id (FK) (INT) | Transaction id of 'requesting' transaction. Ie that transaction for which this is the result | |
| Inserted_dt_tm(DT) | Date/time row created | |
| Data_retrvd_dt_tm(DT) | Date/Time data was retrieved by user via Web | If null, User has not yet viewed results. |
| URL_ID(FK) (INT) | Key field of URL table | Null if results not in URL table |
| URL(VC 255) | Actual URL | Eg www.xyz.org |

TABLE 6

Table: Search_results_transaction
Purpose: To store search results which have been obtained against the transaction table.
Comments: Created by search processes as appropriate hits are found. A new row is created by each hit; data is not accumulated in a row. When users logon, this table will be searched to see if new results from last session are there.
Volume: Based on number of hits per search.

| FIELD | DESCRIPTION | COMMENT |
|---|---|---|
| Cin (k)(INT) | | |
| Tran_id(FK)(INT) | Transaction id of 'requesting' transaction. | |
| Inserted_dt_tm(DT) | Date/time row created | |
| Data_retrvd_dt_tm(DT) | Date/Time data was retrieved by user via Web | If null, User has not yet viewed results. |
| Tran_id(FK) (INT) | Transaction id of transaction which 'answers' the requesting transaction | |

TABLE 7

Table: Logon_strat_by_url
Purpose: To assist Web Crawler and agents. Once a succesful logon strategy has been found for a Url, it is stored here. Agents and Web Crawlers can search here when needing to logon to a particular Url. A row is created when the crawler or an agent successfully hack into a url for the first time.
Comments:
Volume: number of keywords times number of url's containing that keyword

| FIELD | DESCRIPTION | COMMENT |
|---|---|---|
| Url_id(FK) (INT) | | |
| Strategy(TEXT) | Logon strategy that worked for this url | The actual CGI script used for loging in. |
| Hackin_dt_tm(DT) | Date/time row created | |
| URL (VC 250) | Actual URL | |

TABLE 8

Table: Url_by_keyword
Purpose: To associate url's with keyword. For use by agent searches etc. Will be populated by Web Crawler and agents. (possibly manually)
Comments:
Volume: number of keywords times number of url's containing that keyword. (Potentially in the billions)

| FIELD | DESCRIPTION | COMMENT |
|---|---|---|
| Keyword(K) | | See Keyword table |
| Interest_area(FK) | | An A4A interest area such as Pokemon etc. |
| Url_ID(fk) | | |
| URL | Actual URL | |

TABLE 9

Table: Transactions
Purpose: This tables stores information about user acitivty and transactions. Whenever a user launches a search or posts a want add, data will be placed here. Independent Processes will query this table (along with the URL table) to come up with matches. Processes interacting against this table and against the URL; in essence, perform what was previously conceptualized as 'agent-to-agent' communication.
Comments:
Volume: Determined by number of user logons and search launches

| FIELD | DESCRIPTION | COMMENT |
|---|---|---|
| Cin(FK)(INT) | Cin of customer who launched agent. | Null if not launched by customer |
| Tran_id(K)(INT) | Key to this table- a unique identifier for each transaction. | |
| Tran_dt_tm(DT) | Date/time row created | |
| Security_key(VC 50) | Security certificate of launching party | (to be used if interagent communication is using security keys) |
| Keyword_strng(VC 255) | String of keywords used for search. | EG 'FORD, BRONCO, BROWN' |
| Display_option(CHAR(1)) | Whether use ants display to be whole text or just address | A = Address, F = Full page |
| Reg-exp (VC 255) | The regular expression generated by agent for this search | |
| Dollar_limit_item(money) | Dollar limit per individual item purchased. | ? |
| Robot_name(VC 20) | (name of ROBOT used in this transaction) | (See Robot_by_customer table) |
| Dollar_limit_total(money) | Total dollar limit of all items for this transaction | ? |
| Tran_comp_cd(INDEX)(Char(1)) | Transaction completion code. (Note want to index on this if possible for efficiency sake.) | If a transaction took place, b = buy, s = sell, t = trade, I = information returned O = still open. Note searches will normally ignore rows not still open |
| Tran_subj(VC 255) | Subject: of transaction (description of object bought or sold etc. | Free text |

TABLE 9-continued

Table: Transactions
Purpose: This tables stores information about user acitivty and transactions. Whenever a user launches a search or posts a want add, data will be placed here. Independent Processes will query this table (along with the URL table) to come up with matches. Processes interacting against this table and against the URL; in essence, perform what was previously conceptualized as 'agent-to-agent' communication.
Comments:
Volume: Determined by number of user logons and search launches

| FIELD | DESCRIPTION | COMMENT |
|---|---|---|
| URL_ID(FK)(INT) | If use submits a URL as part of transaction | (Note: URL must be in our table-otherwise this filed is null) |
| URL(VC 255) | If user submits a URL as part of transaction | (IF URL not in our URL table) |
| Activity_type(char(1)) | Activity type represneted by this transaction | EG: S = Search N = Negotiate (see Web page for further examples) |
| Credit_cd_type(Char(1) | Visa, Mastercard etc. If a credit card was used for this particular transaction | VI = Visa, MA = Mastercard erc. |
| Credit_cd_num(CH 25) | Credit card number | |
| Credit_cd_exp_dt(DT) | Exp dt for this credit card | |
| Periodicity(CH 2) | Periodicity requested by user to have agent rerun. Eg if they request weekly, daily, monthly. Used in conjunction with Transaction_launched table. | Set 1: a-Monday b-Tuesday etc. g-Sunday Set 2: Day of month: 1–28, L = last day of month |
| Comp_dt_tm(DT) | Dt/tm this transasction is 'closed' due to sale etc. | (filled in when tran_comp_ code no longer open) |

TABLE 10

Table: Transaction_images
Purpose: To store image data associated with a transaction.
Comments: One per URL we collect.
Volume: depends on restrictiveness of subject area etc.

| | | |
|---|---|---|
| Tran_id(K) | Key to this table- a unique identifier for each transaction. | |
| Image1(image) | Image object if provided | |
| Image2(Image) | $2^{nd}$ image object | |

TABLE 11

Table: Transaction_launched
Purpose: to keep track of when a particular transaction is launched and when it is closed out. For example, if there is a weekly or monthly process (see periodicity column in Transactions table), this table will mark that the background process has been started, and when it has been stopped. There will be one row for each iteration (ie this weeks process, next week's process etc).
Comments:
Volume: One row per agent launching.

| | |
|---|---|
| Tran_id(K) | Transaction key. There may be multiple rows with this key |

TABLE 11-continued

Table: Transaction_launched
Purpose: to keep track of when a particular transaction is launched and when it is closed out. For example, if there is a weekly or monthly process (see periodicity column in Transactions table), this table will mark that the background process has been started, and when it has been stopped. There will be one row for each iteration (ie this weeks process, next week's process etc).
Comments:
Volume: One row per agent launching.

| | |
|---|---|
| Launch_dt_tm | Date time this particular itereation of the transaction was launched |
| End_dt_dt | Date time this particular iteration was finished |

TABLE 12

Table: Transaction_files
Purpose: To store files associated with a transaction.
Comments: One per file submitted per transaction.
Volume: Number of transactions where usr submits one or two files

| | |
|---|---|
| Tran_id(K) | Key to this table- a unique identifier for each transaction. |
| file1(TEXT) | $1^{st}$ File attached to tran |
| File2(TEXT) | $2^{nd}$ Files attached to tran |

TABLE 13

Table: URL
Purpose: To store information about URL's. Created by A4a Web Crawler.
Comments: One per URL we collect.
Volume: depends on restrictiveness of subject area etc.

| FIELD | DESCRIPTION | COMMENT |
|---|---|---|
| URL_ID(K) (INT) | Unique key to this table | |
| URL(VC 255) | Actual URL | |
| Interest_area(fk)(VC 50) | Primary Subject area this URL represents if one of A4A's areas | Null if not an identified a4a interest area |
| Domain_type(k)(VC 50) | Edu, Com etc | |
| Ip_address(VC 25) | | |
| Login(CH 1) | Y/n indicator for if page requires login | |
| Text(text) | Text of page | |
| Org(VC 25) | Organization or company sponsoring Web Page | |
| Type(CH 1) | E = E commerce, I = individual etc. | Needs definition |
| Format(CH 1) | H = html X = xml, T = plain text, O = other | |
| Obsoleted_dt_tm(DT) | Date time in which URL maintenance process discovers that this URL is no longer active. | |
| Updt_dt_tm(DT) | Date/time row insterted or last updated. | |

TABLE 14

Table: last_cin table
Purpose: to keep value of last cin issued.
When a customer signs up, this table will be
referred to to get the appropriate cin.
Comments:
Volume: one row.

| FIELD | DESCRIPTION | COMMENT |
|---|---|---|
| cin(K)(INT) | | |

TABLE 15

Table: Keywords
Purpose: To store keywords for searches.
Comments: To be updated manually and by agents
and Web Crawler.
Volume: number of keywords (approx 10,000 at startup)

| FIELD | DESCRIPTION | COMMENT |
|---|---|---|
| Keyword(k)(VC 50) | | |
| Added_dt_tm(DT) | Date/Time keyword added | |
| Ai_number(int) | Ai number of agent that added keyword | (will use a reserved number such as '999999') for Web Crawler. Null if added manually |

TABLE 16

Table: Keyword_links
Purpose: To store related keywords for helping inform customers of related interests.
Comments: To be updated manually and by agents and Web Crawler.
Volume: number of keywords times number of linked keywords

| FIELD | DESCRIPTION | COMMENT |
|---|---|---|
| Keyword(K) (VC 50) | | |
| Linked_keyword(FK)(VC 50) | | Keyword table |
| Added_dt_dt(DT) | Date/Time keyword link added. | |

TABLE 17

Table: Search_strategy_by_keyword
Purpose: To store search strategies useful for given keywords or keyword phrases. The search programs will look here to see if the keywords the user has supplied have an existing search staretegy. If so, that program will include the subroutine or lines of code included here to guide the search. There may be multiple search strategies per keyword/keyword phrase.
Comments: To be updated manually.
Volume: number of startegies that have been determined.

| FIELD | DESCRIPTION | COMMENT |
|---|---|---|
| Keyword(K) (VC 50) | | Same key as Keyword table |
| Search_strategy(text) | The lines of code or subroutine the search program will incorporate | Keyword table |
| Added_dt_dt(DT) | Date/Time stratedy added. | |

TABLE 18

Table: Products
Purpose: To store a4a product information.
Comments:
Volume: Minimal..depending on number of products offered..

| FIELD | DESCRIPTION | COMMENT |
|---|---|---|
| Product_number(k) | | |
| Prod_desc | Description of product | |
| Prod_price | Price of product | |
| Prod_st_date | Date Product is available from | |
| Prod_end_dt | Date Product is taken off market | |
| License_period | Length of time product is licensed for. | |
| Authority_lvl | Authority level inherent in product. 1 = browse only 2 = requires client verification before purchase, 3 = can make purchases etc without client verifiction | A client can reduce but not augment authority level here. The authority level per agent is referenced in the agent_instantiation table. |

TABLE 19

Table: URL_forward_Links
Purpose: To show links between URLS. Created by A4a Web Crawler.
Comments: The key is the 'linking' URL-ie the url which points to another one.
Volume: Number of URLS times number of their links.
IF URL contains no links, it will not be in the table.

| FIELD | DESCRIPTION | COMMENT |
|---|---|---|
| URL(k)(non unique)(VC 255) | Actual URL | |
| Linked_URL(K)(VC 255) | | |
| Updt_dt_tm(DT) | Date/time row insterted or last updated. | |

TABLE 20

Table: Item
Purpose: To store items that a4a has identified.
Comments: Areas of specialization for a4a (such as Pokemon cards) will be described here. When transactions deal with one of these, appropriate tables will point here, otherwise will use free text descriptions
Volume: Depends on number of items a4a identifies.

| FIELD | DESCRIPTION | COMMENT |
|---|---|---|
| Item(K)(INT) | Will use dt/tm stamp | |
| Description(VC 50) | Item description such as computer make and model or Pokemon card | |
| Keyword(FK)(VC 50) | Keyword this item best corresponds to in our keyword table | |

What is claimed is:

1. In an information network comprising a plurality of network sites, a method of providing a network user with information contained within at least one of said network sites in view of a user search criteria, said method comprising the steps of:

providing a database;

populating said database with a plurality of other search criteria provided by other network users and a plurality of search strategies, each of said search strategies comprising information regarding network sites likely to contain information relevant to said other search criteria;

within said database, linking said other search criteria with said search strategies;

selecting from said database at least one search strategy based upon said user search criteria;

executing said at least one search strategy; and providing search results to the user.

2. The method of claim 1 wherein said user search criteria comprises text string data and the step of selecting from said database at least one search strategy comprises the steps of:

comparing said user search criteria with said other search criteria for text string matches; and for each text string match, selecting the search strategy linked to said other criteria associated with said text string.

3. The method of claim 1 wherein the step of executing said at least one search strategy comprises the steps of:

accessing each of said network sites provided by said search strategy; and scanning a text file defining each of said network sites for information that satisfies said user search criteria.

4. The method of claim 3 wherein the step of scanning a text file comprises the steps of:

requesting a meta data format document of said network site from said network site; and scanning the meta data format document for matches with said search criteria.

5. The method of claim 3 wherein the step of scanning a text file comprises the steps of:

searching said network site for an extended markup language (XML) document of said network site; and scanning the XML document for matches with said search criteria.

6. The method of claim 3 wherein the step of scanning a text file comprises the steps of:

searching said network site for a hypertext markup language (HTML) document of said network site; and scanning the HTML document for matches with said search criteria.

7. The method of claim 3 wherein the step of scanning a text file comprises the steps of:

searching said network site for an hypertext markup language (HTML) document of said network site;

converting said HTML document to a meta data format document; and scanning the meta data format document for matches with said search criteria.

8. The method of claim 1 wherein said user search criteria comprises visual image data and the step of selecting from said database at least one search strategy comprises the steps of:

comparing said user search criteria with said other search criteria for visual image data matches; and for each visual image data match, selecting the search strategy linked to said other criteria associated with said visual image data.

9. The method of claim 1 wherein said user search criteria comprises audio data and the step of selecting from said database at least one search strategy comprises the steps of:

comparing said user search criteria with said other search criteria for audio data matches; and for each audio data match, selecting the search strategy linked to said other criteria associated with said audio data.

10. The method of claim 1 wherein said user search criteria comprises audio/visual data and the step of selecting from said database at least one search strategy comprises the steps of:

comparing said user search criteria with said other search criteria for audio/visual data matches; and for each audio/visual data match, selecting the search strategy linked to said other criteria associated with said audio/visual data.

11. In an information network comprising a plurality of provider network sites, each having a provider associated therewith, and a plurality of requester network sites, each having a requester associated therewith, a method of introducing providers and requesters to each other based on a search criteria provided by at least one of said providers and requesters, said method comprising the steps of:

providing a database;

populating said database with network site data representative of the content of the network site from a plurality of said requester network sites and provider network sites, a plurality of other search criteria provided by other providers and requesters, and a plurality of search strategies comprising information regarding network sites likely to contain information relevant to said other search criteria;

linking at least one of said search strategies with at least one of said other search criteria;

on behalf of each requester providing requester search criteria, creating a requester search agent and employing said search agent to:

search said database for network site data and other search criteria relevant to said requester search criteria;

for each relevant other search criteria, executing said at least one search strategy linked with said other search criteria to search said information network for network sites having data relevant to said requester search criteria;

providing search results to said requester; and on behalf of each provider providing provider search criteria, creating a provider search agent and employing said search agent to:

search said database for network site data and other search criteria relevant to said provider search criteria;

for each relevant other search criteria, executing said at least one search strategy linked with said other search criteria to search said information network for network sites having data relevant to said provider search criteria; and providing search results to said provider.

12. The method of claim 11 wherein at least one of said providers and at least one of said requesters provides negotiation parameters in addition to said respective search criteria and said respective provider search agent and requester search agent are further employed to negotiate with other respective requester search agents and provider search agents in order to complete an introduction.

13. The method of claim 12 wherein said negotiation parameters includes at least one of a maximum offer price, starting offer price, counteroffer prices, time between counteroffers and negotiation time.

14. The method of claim 12 wherein at least one of said requesters provides consummation data in addition to said search criteria and said respective requester search agent is further employed to initiate and consummate a transaction with at least one provider search agents.

15. The method of claim 14 wherein consummation data comprises at least one of credit card information, digital signature data and security encryption data.

16. A method of communicating among a plurality of software agents, each agent employed by a user to search an information network comprising a plurality of network sites for information responsive to an individual search criteria, said method comprising the steps of:

for each individual search criteria, storing information data relevant to said search criteria in a database wherein said information comprises at least one search strategy associated with said individual search criteria, said search strategy comprising information regarding network sites likely to contain information relevant to said individual search criteria; and for each software agent, searching said database for information data relevant to said individual search associated with said software agent.

17. The method of claim 16 wherein said information data comprises keywords and phrases descriptive of said individual search criteria and the step of searching said database for information data relevant to said individual search associated with said software agent comprises the step of scanning said keywords and phrases.

18. In an information network comprising a plurality of network sites, a method of locating data relevant to a search criteria provided by a user, said method comprising the steps of:

providing a database;

populating said database with data representative of other search criteria provided by other users;

populating said database with a plurality of search strategies, each search strategy comprising information regarding network sites likely to contain information relevant to the other search criteria;

linking at least one of said search strategies with at least one of said other search criteria;

on behalf of said user, creating a search agent and employing said search agent to:

search said database for other search criteria relevant to said user search criteria;

for each relevant other search criteria, executing said at least one search strategy linked with said other search criteria to search said information network for network sites having data relevant to said user search criteria;

providing search results to said user.

19. The method of claim 18 wherein said user search criteria comprises text string data and the step of selecting from said database at least one search strategy comprises the steps of:

comparing said user search criteria with said other search criteria for text string matches; and for each text string match, selecting the search strategy linked to said other criteria associated with said text string.

20. The method of claim 18 wherein the step of executing said at least one search strategy comprises the steps of:

accessing each of said network sites provided by said search strategy; and scanning a text file defining each of said network sites for information that satisfies said user search criteria.

21. The method of claim 20 wherein the step of scanning a text file comprises the steps of:

requesting a meta data format document of said network site from said network site; and scanning the meta data format document for matches with said search criteria.

22. The method of claim 20 wherein the step of scanning a text file comprises the steps of:

searching said network site for an extended markup language (XML) document of said network site; and scanning the XML document for matches with said search criteria.

23. The method of claim 20 wherein the step of scanning a text file comprises the steps of:

searching said network site for a hypertext markup language (HTML) document of said network site; and scanning the HTML document for matches with said search criteria.

24. The method of claim 20 wherein the step of scanning a text file comprises the steps of:

searching said network site for an hypertext markup language (HTML) document of said network site;

converting said HTML document to a meta data format document; and scanning the meta data format document for matches with said search criteria.

25. The method of claim 18 wherein said user search criteria comprises visual image data and the step of selecting from said database at least one search strategy comprises the steps of:

comparing said user search criteria with said other search criteria for visual image data matches; and for each visual image data match, selecting the search strategy linked to said other criteria associated with said visual image data.

26. The method of claim 18 wherein said user search criteria comprises audio data and the step of selecting from said database at least one search strategy comprises the steps of:

comparing said user search criteria with said other search criteria for audio data matches; and for each audio data match, selecting the search strategy linked to said other criteria associated with said audio data.

27. The method of claim 18 wherein said user search criteria comprises audio/visual data and the step of selecting from said database at least one search strategy comprises the steps of:

comparing said user search criteria with said other search criteria for audio/visual data matches; and for each audio/visual data match, selecting the search strategy linked to said other criteria associated with said audio/visual data.

* * * * *